(12) United States Patent
Sato et al.

(10) Patent No.: US 9,070,920 B2
(45) Date of Patent: Jun. 30, 2015

(54) SOLID OXIDE FUEL CELL DEVICE

(71) Applicant: TOTO LTD., Kitakyushu-shi, Fukuoka (JP)

(72) Inventors: Masaki Sato, Fujisawa (JP); Naoki Watanabe, Chigasaki (JP); Nobuo Isaka, Yokohama (JP); Shigeru Ando, Odawara (JP); Yutaka Momiyama, Yokohama (JP); Kiyoshi Hayama, Fujisawa (JP); Seiki Furuya, Fujisawa (JP); Osamu Okamoto, Chigasaki (JP)

(73) Assignee: TOTO LTD., Fukuoka (JP)

( * ) Notice: Subject to any disclaimer, the term of this patent is extended or adjusted under 35 U.S.C. 154(b) by 148 days.

(21) Appl. No.: 14/039,833

(22) Filed: Sep. 27, 2013

(65) Prior Publication Data

US 2014/0093800 A1   Apr. 3, 2014

(30) Foreign Application Priority Data

Sep. 28, 2012  (JP) ................................. 2012-217487

(51) Int. Cl.
| | |
|---|---|
| *H01M 8/06* | (2006.01) |
| *H01M 8/24* | (2006.01) |
| *H01M 8/04* | (2006.01) |
| *C01B 3/38* | (2006.01) |
| *H01M 8/12* | (2006.01) |

(52) U.S. Cl.
CPC .......... *H01M 8/0618* (2013.01); *H01M 8/0625* (2013.01); *H01M 8/243* (2013.01); *H01M 8/2465* (2013.01); *H01M 8/2475* (2013.01); *H01M 8/04022* (2013.01); *H01M 8/04201* (2013.01); *C01B 3/384* (2013.01); *C01B 2203/0233* (2013.01); *C01B 2203/066* (2013.01); *C01B 2203/0811* (2013.01); *Y02E 60/50* (2013.01); *H01M 8/0662* (2013.01); *H01M 2008/1293* (2013.01); *Y02E 60/525* (2013.01)

(58) Field of Classification Search
CPC .......... H01M 8/04208; H01M 8/1011; H01M 8/0258; H01M 8/0612; H01M 8/0625; H01M 8/0618; H01M 8/06; H01M 8/04201; H01M 8/24
USPC .......................................... 429/512–516, 423
See application file for complete search history.

(56) References Cited

FOREIGN PATENT DOCUMENTS

JP           2010-238600      *   3/2009 .............. H01M 8/04

OTHER PUBLICATIONS

English Translation of JP2010-238600.*

* cited by examiner

*Primary Examiner* — Patrick Ryan
*Assistant Examiner* — Kiran Quraishi
(74) *Attorney, Agent, or Firm* — Brinks Gilson & Lione

(57) ABSTRACT

The present invention is a solid oxide fuel cell 1 including a reforming section 94, disposed inside a fuel gas supply flow path 20 above a vaporizing section 86 to surround the upper portion of a fuel cell stack 14, for steam reforming raw fuel gas F introduced from a fuel gas introducing portion 90a using steam S produced in a vaporizing section; and a circulating flow path portion 156 disposed in a fuel gas supply flow path between the vaporizing section and the reforming section for circulating rising raw fuel gas introduced from a fuel gas introducing section into a fuel gas supply flow path and rising steam produced in the vaporizing section along the circumferential direction of the fuel gas supply flow path so as to form a flow supplying mixed raw fuel gas and steam uniformly over the entire circumference of the reforming section.

5 Claims, 9 Drawing Sheets

SOLID OXIDE FUEL CELL DEVICE

RELATED APPLICATIONS

This application claims priority under 35 U.S.C. §119 to Japanese Patent Application No. 2012-217487 filed on Sep. 28, 2012, the entire content of which is hereby incorporated by reference.

BACKGROUND OF THE INVENTION

1. Field of the Invention

The present invention pertains to a solid oxide fuel cell, and more particularly to a solid oxide fuel cell for reforming a hydrocarbon raw fuel gas and generating electricity using the reformed fuel gas.

2. Description of the Related Art

Solid oxide fuel cells ("SOFC" below) use oxide ion-conductive solid electrolytes; these are fuel cells which operate at comparatively high temperatures, to which electrodes are attached on both sides, and fuel gas is supplied to one side while oxidant gas (air, oxygen, etc.) is supplied to the other.

In conventional solid oxide fuel cells such as that described in Patent Document 1, a box-shaped reformer is disposed at the top of a fuel cell stack; this reformer is heated by the combustion heat produced by the combustion of off-gas flowing out from the top end of each cell in the fuel cell stack. Raw fuel gas and water for steam reforming are supplied to the reformer, and the raw fuel gas is steam reformed by bringing a mixed gas of raw fuel gas and steam into contact with a reforming catalyst filling the reformer.

In a reformer of this type, the raw fuel gas and steam are fed into the reforming catalyst after flowing through a relatively long passageway, so that the supplied raw fuel gas and steam are fully mixed. To ensure that the mixed gas of raw fuel gas and steam fully contacts the reforming catalyst, the mixed gas is reformed as it flows through the relatively long passageway inside the reformer. Patent Document 1: Published Unexamined Patent Application 2010-238600

SUMMARY OF THE INVENTION

Problems to be Resolved by the Invention

However, the reformer of the fuel cell set forth in Patent Document 1 has the problem that because the mixed gas of raw fuel gas and steam passes through a long passageway to be reformed, pressure losses in the reformer are large. Making the raw fuel gas targeted for reforming pass through the raw fuel gas requires strongly pressurizing the raw fuel gas to feed it to the reformer.

In the solid oxide fuel cell set forth in Patent Document 1, the reformer is disposed over the fuel cell stack, and is direct-heated from below by the heat of combustion of off-gas flowing out of each cell, leading to the problem that a large occupied projected surface area is required. I.e., reforming a certain quantity of raw fuel gas requires a predetermined volume of reforming catalyst, but uniform direct heating of a reforming catalyst of this predetermined volume using off-gas combustion heat requires distributing the reforming catalyst thinly over a broad surface area, thereby increasing the occupied projected surface area of the reformer.

Furthermore, the solid oxide fuel cell of Patent Document 1 is a structure in which a mixed gas of raw fuel gas and steam is supplied from a single location on one side of the rectangular parallelepiped-shaped reformer extending in the horizontal direction from the side of the solid oxide fuel cell module, therefore the mixed gas of raw fuel gas and steam cannot be supplied to the entire reformer without unevenness; the possibility exists that part of the reforming catalyst will be consumed unevenly, and the temperature of the whole reformer cannot be rapidly raised.

The present invention was therefore undertaken to solve the above-described problems, and has the object of providing a solid oxide fuel cell device capable of supplying mixed fuel gas and steam uniformly without unevenness to the entire reforming section (reformer).

Means for Resolving Problems

In order to resolve the above-described problems, the present invention is a solid oxide fuel cell device for generating electricity using reformed fuel gas from a hydrocarbon raw fuel gas, comprising: a fuel supply apparatus that supplies raw fuel gas; a water supply apparatus that supplies water to steam reform raw fuel gas supplied by the fuel supply apparatus; an oxidant gas supply apparatus that supplies oxidant gas for electrical generation; a fuel cell stack that produces electrical power by reacting the oxidant gas for electrical generation supplied by the oxidant gas supply apparatus and reformed fuel gas; a combustion section placed above the fuel cell stack, that combusts remaining fuel gas not used for electrical generation in the fuel cell stack; an inside cylindrical member formed in a substantially cylindrical shape to surround the perimeter of the fuel cell stack; an outside cylindrical member formed in a substantially cylindrical shape to surround the perimeter of the inside cylindrical member; a fuel gas supply flow path formed in ring shape between the outside wall surface of the inside cylindrical member and the inside wall surface of the outside cylindrical member, to receive heat from the fuel cell stack and the combustion section; a fuel gas introducing section, disposed at the lower portion of the fuel gas supply flow path, that introduces raw fuel gas supplied from the fuel supply apparatus into the fuel gas supply flow path; a water introducing section, disposed at the lower portion of the fuel gas supply flow path, that introduces water supplied from the water supply apparatus into the fuel gas supply flow path; a vaporizing section, disposed above the fuel gas introducing section, that vaporizes water supplied from the water introducing section; a reformer disposed within the fuel gas supply flow path above the vaporizing section, to surround the upper portion of the fuel cell stack, that steam reforms raw fuel gas introduced from the fuel gas introducing section using steam produced in the vaporizing section; and a rotary flow path section, placed inside the fuel gas supply flow path between the vaporizing section and the reformer, that causes raw fuel gas introduced into and rising in the fuel gas supply flow path from the fuel gas introducing section and steam produced in the vaporizing section and rising therein to rotate along the circumferential direction of the fuel gas supply flow path, forming a flow which uniformly supplies mixed raw fuel gas and steam over the entire circumference of the reformer.

In the present invention thus constituted, rising raw fuel gas introduced from the fuel gas introducing section into the fuel gas supply path, and rising steam produced in the vaporizing section, are caused to circulate along the circumferential direction of the fuel gas supply path by flowing in the circulating flow path, thereby becoming mutually mixed. The mixed raw fuel gas and steam then further rises, and is supplied uniformly over the entire circumferential of the reformer.

Since it is therefore possible to supply mixed fuel gas and steam evenly and uniformly to the entire reformer, unevenness in the reforming reaction in the reformer can be restrained, and a solid oxide fuel cell device with excellent practical use can be obtained.

In the present invention the rotary flow path section is preferably furnished with a helical flow path section forming a helical flow path, that causes rising raw fuel gas introduced from the fuel gas introducing section into the fuel gas supply flow path and rising steam produced in the vaporizing section to rotate along the circumferential direction of the fuel gas supply flow path; and a single first dispersion chamber for homogenizing the mixing of raw fuel gas and steam mixed in the helical flow path section, and dispersing same over the entire circumference of the reformer.

In the present invention thus constituted, rising raw fuel gas introduced from the fuel gas introducing section into the fuel gas supply path, and rising steam produced in the vaporizing section, are reliably mixed by flowing through the helical flow path section of the circulating flow path section, and circulating along the circumferential direction of the fuel gas supply flow path. Forming a single first dispersion chamber between the helical flow path section and the reformer enables equalization of the mixing ratios of raw fuel gas and steam flowing out from the helical flow path section to render them uniform for dispersion over the entire circumference of the reformer, so that raw fuel gas and steam mixed in uniform proportions can be reliably and uniformly supplied to the entire reformer.

In the present invention the rotary flow path section is preferably further furnished with a single second dispersion chamber formed between the vaporizing section and the helical flow path section, that disperses rising raw fuel gas introduced from the fuel gas introducing section into the fuel gas supply flow path, and rising steam produced in the vaporizing section, and the volume of the second dispersion chamber is set to be smaller than the volume of the first dispersion chamber.

In the present invention thus constituted, the formation of a single second dispersion chamber between the vaporizing section and the helical flow path section enables reliable supplying of rising raw fuel gas introduced from the fuel gas introducing section into the fuel gas supply path, and rising steam produced in the vaporizing section, to the helical flow path section from the second dispersion chamber, and mixing of same in the helical flow path section. Setting the volume of the second dispersion chamber to be smaller than the volume of the first dispersion chamber permits the helical flow path section and the vaporizing section to be brought into mutual proximity, so that heat in the helical flow path section can be transferred to the lower vaporizing section, therefore raw fuel gas and steam can be reliably guided to the helical flow path section together with the rising current generated by the heat transferred to this vaporizing section.

In the present invention, the helical flow path section of the rotary flow path section is preferably furnished with multiple helical flow passageways formed in a helical shape along the circumferential direction of the helical flow path section.

In the present invention thus constituted, because the helical flow path section of the circulating flow path section is furnished with multiple helical flow paths, a greater portion of the heat in the circulating flow path section is transferred through the multiple helical flow paths to the vaporizing section below, therefore more rising current of raw fuel gas and steam from the vaporizing section to the helical flow path section can be generated, and raw fuel gas and steam can be uniformly supplied without unevenness to the helical flow path section, thus restraining variability in the mixing ratios of raw fuel gas and steam between helical flow paths.

In the present invention the multiple helical flow passageways of the helical flow path section are preferably each furnished with an entrance positioned at the bottom end, and an exit positioned approximately above the position of the entrance; and the length of the flow path from the entrance to the exit along the helical flow passageway is approximately equal to the outside perimeter length of the inside cylindrical member.

In the present invention thus constituted, the positions of each exit of the multiple helical flow paths of the helical flow path section are positioned essentially above each of the entrance positions, and the flow path lengths of each helical flow path are approximately equal to the outside perimeter length of the inside cylindrical member, and since multiple helical flow paths surround the perimeter of the fuel cell stack, the thermal effects of the helical flow paths on the fuel cell stack can be made uniform. Keeping the flow path length of the respective multiple helical flow paths of the helical flow path section at about the length of the outer perimeter of the inside cylindrical member prevents unnecessary increases in pressure losses inside the helical flow paths, therefore raw fuel gas and steam can be circulated inside the helical flow path to improve mixing characteristics, and raw fuel gas and steam can be reliably supplied to the reformer with even a small rising current.

EFFECT OF THE INVENTION

Using the solid oxide fuel cell device of the present invention, mixed fuel gas and steam can be evenly and uniformly supplied to the entirety of a reforming section (reformer).

DETAILED DESCRIPTION OF THE PREFERRED EMBODIMENTS

Next, referring to the attached drawings, we discuss a solid oxide fuel cell device (SOFC) according to an embodiment of the present invention.

Figure 1:
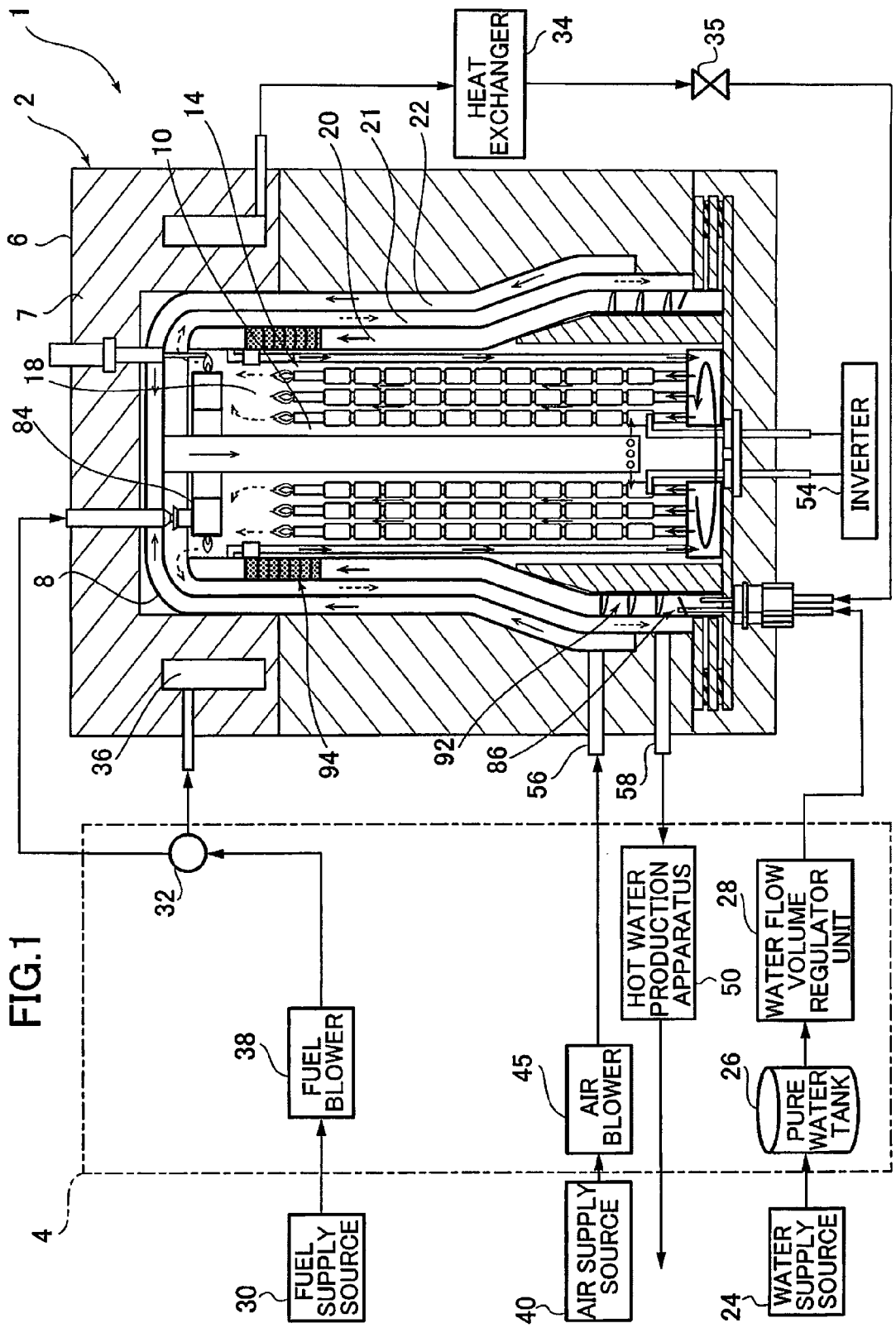
FIG. 1: An overview diagram showing a solid oxide fuel cell (SOFC) according to an embodiment of the present invention.

FIG. 1 is an overview diagram showing a solid oxide fuel cell device (SOFC) according to an embodiment of the present invention. As shown in FIG. 1, the solid oxide fuel cell device (SOFC) of this embodiment of the present invention is furnished with a fuel cell module 2 and an auxiliary unit 4.

Fuel cell module 2 is furnished with a housing 6, and a fuel cell housing container 8 is formed within this housing 6, mediated by heat storage material 7. A generating chamber 10 is formed at the lower portion inside this fuel cell housing container 8; a fuel cell stack 14 for performing an electrical generating reaction using fuel gas and air as the oxidant gas is housed within this generating chamber 10. This fuel cell stack 14 comprises 100 individual fuel cell units 16, disposed concentrically.

Combustion chamber 18 serving as combustion section is formed at the top of generating chamber 10 inside fuel cell housing container 8 (at the top of fuel cell stack 14); residual fuel (off-gas) not used in the electrical generation reaction and remaining is combusted with residual air in this combustion chamber 18 to produce exhaust gas.

Next, auxiliary unit 4 is furnished with a pure water tank 26 for holding water from a municipal or other water supply source 24 and filtering it into pure water, and a water flow volume regulator unit 28 (a motor-driven "water pump" or the like) for regulating the flow volume of water supplied from this pure water tank. Auxiliary unit 4 is furnished with a fuel blower 38 (a motor-driven "fuel pump" or the like), which is a fuel supply apparatus for regulating the flow volume of a hydrocarbon raw fuel gas such as municipal gas supplied from fuel supply source 30, and with a proportional valve 32 for distributing the raw fuel gas fed from this fuel blower 38.

Note that raw fuel gas passing through proportional valve 32 passes through a desulfurizer 32 disposed inside fuel cell module 2, a heat exchanger 34, and an electromagnetic valve 35 to be introduced into fuel cell housing container 8. The desulfurizer 32 is formed in a ring shape to surround the perimeter of fuel cell housing container 8, and removes sulfur from the raw fuel gas. Heat exchanger 34 is provided to prevent high temperature raw fuel gas, whose temperature has risen in desulfurizer 32, from flowing directly into electromagnetic valve 35 and degrading electromagnetic valve 35. Electromagnetic valve 35 is provided to stop the supply of raw fuel gas into the fuel cell housing container.

Auxiliary unit 4 is furnished with an air flow regulator unit 45, which is an oxidant gas supply apparatus for regulating the flow volume of air supplied from air supply source 40.

In addition, auxiliary unit 4 is furnished with a hot water production apparatus 50 for recovering the heat of exhaust gas from fuel cell module 2. Tap water is supplied to this hot water production apparatus 50; this tap water becomes hot water by the heat of the exhaust gas, and is supplied to a hot water tank in an external hot water device, not shown.

In addition, an inverter 54, which is a power extraction section (electrical power conversion section) for supplying power generated by the fuel cell module 2 to the outside, is connected to fuel cell module 2.

Next we discuss individual fuel cell units 16.

In a solid oxide fuel cell 1 according to an embodiment of the present invention, cylindrical lateral-banded cells utilizing solid oxide are employed as individual fuel cell units 16.

Individual fuel cell units 16 are furnished with a cylindrical inside electrode layer (not shown), an electrolytic layer (not shown) disposed on the perimeter of the inside electrode layer; and an outside electrode layer (not shown) disposed on the perimeter of this electrolytic layer. The inside electrode layer (not shown) is a fuel electrode through which fuel gas passes and has a (−) pole; on the other hand the outside electrode layer (not shown) is an air electrode in contact with the air; this is a (+) electrode. Individual fuel cell units 16 are comprised by attaching each of the different types of electrode terminals (not shown) to a cylindrical member formed by this inside electrode layer (not shown), electrolytic layer (not shown), and outside electrode layer (not shown). In actual use, fuel gas is caused to flow in a passage (not shown) on the inside of the cylindrical inside electrode layer (not shown), and air acting as oxidant gas for electrical generation is caused to flow around the outside electrode layer (not shown).

The inside electrode layer (not shown) is formed, for example, from at least one of the following: a mixture of Ni with zirconia doped with at least one rare earth element selected from among Ca, Y, Sc, or the like; a mixture of Ni with ceria doped with at least one element selected from among rare earth elements; or a mixture of Ni with lanthanum gallate doped with at least one element selected from among Sr, Mg, Co, Fe, or Cu.

The electrolyte layer (not shown) is formed, for example, from at least one of the following: zirconia doped with at least one rare earth element selected from among Y, Sc, or the like; ceria doped with at least one element selected from among rare earth elements; or lanthanum gallate doped with at least one element selected from among Sr or Mg.

The outside electrode layer (not shown) is formed, for example, from at least one of the following: lanthanum manganite doped with at least one element selected from Sr or Ca; lanthanum ferrite doped with at least one element selected from among Sr, Co, Ni, or Cu; or lanthanum cobaltite doped with at least one element selected from among Sr, Fe, Ni, or Cu; or silver, etc.

Fuel cell stack 14 comprises 100 individual fuel cell units 16 disposed concentrically within generating chamber 10 in fuel cell housing container 8. Fuel cell stack 14 is comprised by electrically connecting various electrode terminals (not shown) attached to each individual fuel cell unit 16, and current collectors (not shown), to one another using conductors (not shown). The conductors (not shown) connecting each individual fuel cell unit 16 are connected to a busbar 80 (FIG. 3) and led out from fuel cell housing container 8.

Figure 2:
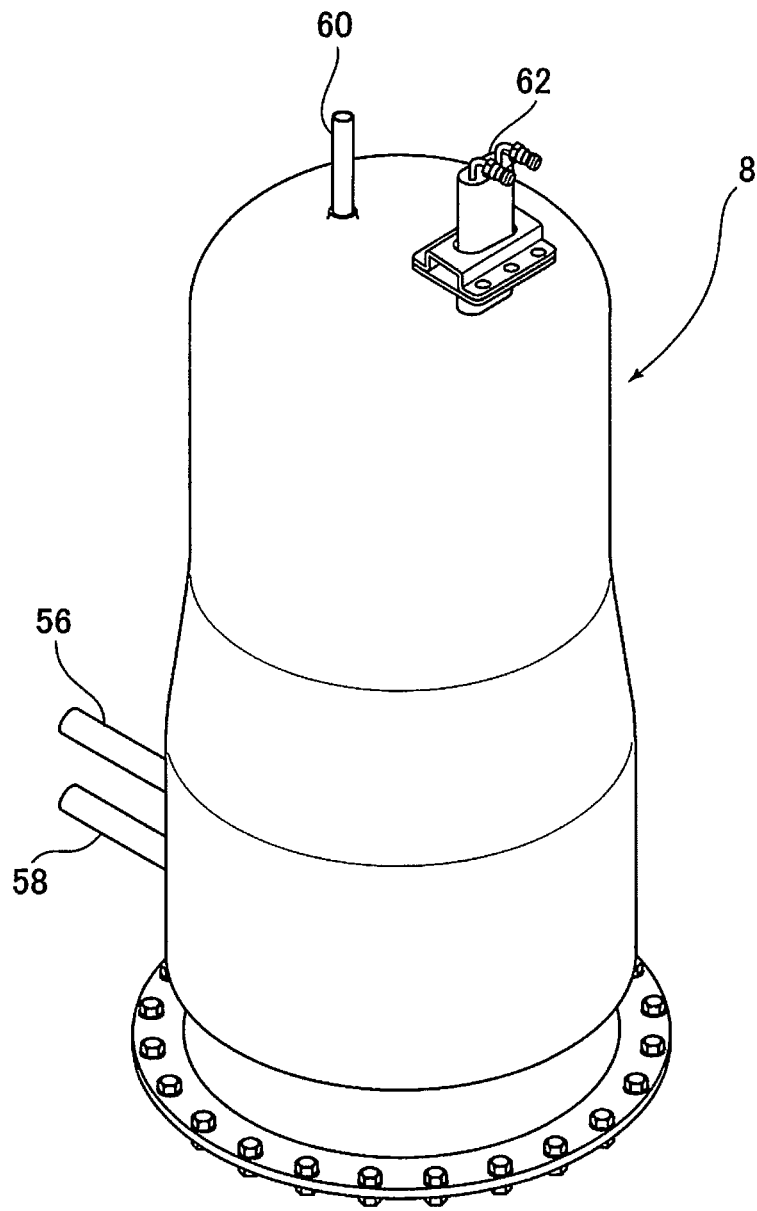
FIG. 2: A perspective view showing the external appearance of a fuel cell housing container provided with a solid oxide fuel cell device according to an embodiment of the present invention.
Figure 3:
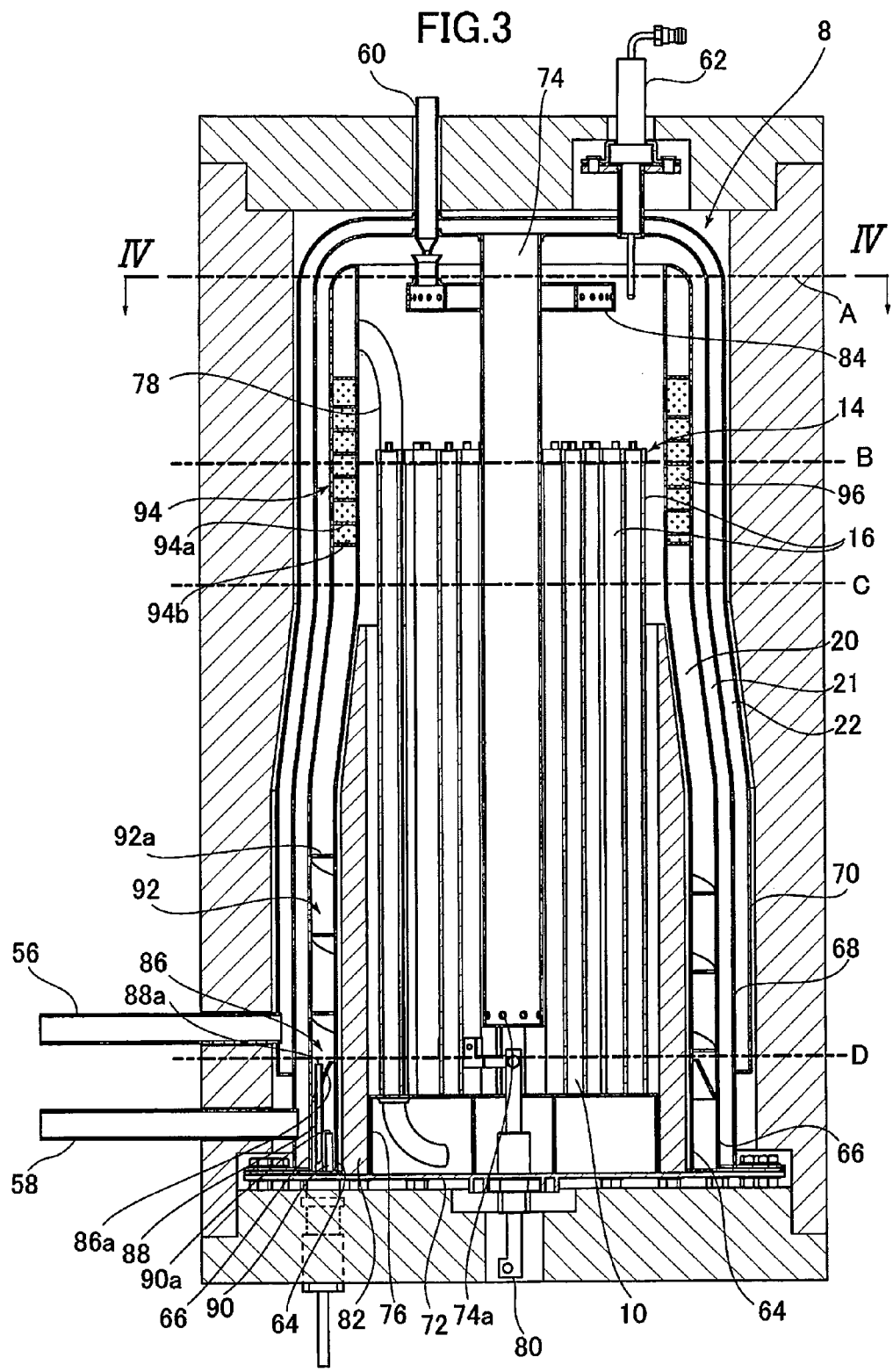
FIG. 3: A sectional diagram of a fuel cell housing container provided with a solid oxide fuel cell device according to an embodiment of the present invention.

Next, referring to FIGS. 2 and 3, we discuss the internal structure of the fuel cell housing container built into the fuel cell module of a solid oxide fuel cell device (SOFC) according to an embodiment of the present invention.

FIG. 2 is a perspective view showing the external appearance of a fuel cell housing container; FIG. 3 is sectional view of a fuel cell housing container.

As shown in FIGS. 2 and 3, a fuel cell stack 14 in which multiple individual fuel cell units 16 are concentrically arrayed is disposed in the sealed space inside fuel cell housing container 8; fuel gas supply flow path 20, exhaust gas discharge flow path 21, and oxidant gas supply fuel path 22 are concentrically formed in sequence to surround the perimeter thereof.

First, as shown in FIG. 2, fuel cell housing container 8 is an approximately cylindrical sealed container, the bottom part of which has an expanded diameter. Connected to the bottom portion side surface of fuel cell housing container 8 are an oxidant gas introducing pipe 56, which is an oxidant gas inflow port for supplying generating air, and an exhaust gas exhaust pipe 58 for discharging exhaust gas. In addition, connected to the top end surface of fuel cell housing container 8 is a burner gas supply pipe 60 for supplying raw fuel gas to a built-in combustion burner, and protruding from the top end surface thereof is an ignition plug 62 for igniting the combustion burner.

As shown in FIG. 3, an inside cylinder member 64, outside cylinder member 66, inside cylinder container 68, and outside cylinder container 70 are disposed in that order from the inside of fuel cell housing container 8 to surround the perimeter of fuel cell stack 14. The above-described fuel gas supply flow path 20, exhaust gas discharge flow path 21, and oxidant gas supply fuel path 22 are flow paths respectively constituted between these cylinder members and cylinder containers, and heat exchange is carried out between adjacent flow paths. I.e., exhaust gas discharge flow path 21 is disposed to surround fuel gas supply flow path 20, and oxidant gas supply fuel path 22 is disposed to surround exhaust gas discharge flow path 21. The bottom surface of fuel cell housing container 8 is sealed by the approximately circular base member 72.

Inside cylinder member 64 is an approximately cylindrical pipe formed of a small diameter portion at the upper portion, a large diameter portion at the lower portion, and a tapered portion connecting these.

Outside cylinder member 66 is a cylindrical pipe disposed around inside cylinder member 64, formed to have an approximately similar shape to inside cylinder member 64 so that an approximately fixed width annular flow path is formed between it and inside cylinder member 64. The annular space between the outer circumferential surface of inside cylinder member 64 and the inner circumferential surface of outside cylinder member 66 functions as fuel gas supply flow path 20. Therefore fuel gas supply flow path 20 receives heat from the surrounding fuel cell stack 14 and combustion chamber 18.

The top end portion of inside cylinder member 64 and the top end portion of outside cylinder member 66 are joined, and the top end of fuel gas supply flow path 20 is sealed.

Inside cylinder container 68 is a circular section cup-shaped member disposed around outside cylinder member 66, the side surface of which is formed to have an approximately similar shape to outside cylinder member 66, so that an annular flow path of appropriate fixed width is formed between it and outside cylinder member 66. The annular space between the outer circumferential surface of outside cylinder member 66 and the inner circumferential surface of inside cylinder container 68 functions as exhaust gas discharge flow path 21. This exhaust gas discharge flow path 21 communicates with the space on the inside of inside cylinder member 64 at the top end portion of outside cylinder member 66. Exhaust gas exhaust pipe 58 serving as exhaust gas discharge port is connected at the lower portion side surface of inside cylinder container 68, and exhaust gas discharge flow path 21 communicates with exhaust gas exhaust pipe 58.

Outside cylinder container 70 is a cup-shaped member with a circular cross section disposed around inside cylinder container 68, the side surface of which is formed to have an approximately similar shape to inside cylinder container 68, so that an annular flow path of an appropriate fixed width is formed between it and inside cylinder container 68. The space between the outer circumferential surface of inside cylinder container 68 and the inner circumferential surface of outside cylinder container 70 functions as oxidant gas supply fuel path 22.

Oxidant gas introducing pipe 56 is connected to the lower portion side surface of outside cylinder container 70; oxidant gas supply fuel path 22 communicates with oxidant gas introducing pipe 56.

Base member 72 is an approximately disk-shaped member; sealed fuel cell housing container 8 is constituted by affixing it, mediated by packing, to a flange erected at the bottom end of inside cylinder container 68. The bottom ends of inside cylinder member 64 and outside cylinder member 66 also extend up to the base member 72.

A circular cross section oxidant gas injecting pipe 74 for injecting generating air is attached to hang down from the ceiling surface of inside cylinder container 68. This oxidant gas injecting pipe 74 extends perpendicularly on the center axis line of inside cylinder container 68, and each individual fuel cell unit 16 is disposed on surrounding concentric circles. By attaching the top end of oxidant gas injecting pipe 74 to the ceiling surface of inside cylinder container 68, communication is established between the oxidant gas supply fuel path 22 formed between inside cylinder container 68 and outside cylinder container 70, and oxidant gas injecting pipe 74. At the same time, the bottom end surface of oxidant gas injecting pipe 74 is closed, and multiple injection ports 74a are provided at the bottom end portion side surface thereof. Air supplied from oxidant gas supply fuel path 22 flows into oxidant gas injecting pipe 74 and is injected in a radial shape toward each of the surrounding individual fuel cell units 16 from the multiple injection ports 74a provided on the bottom end portion side surface thereof A donut-shaped fuel gas dispersion chamber 76 is provided on the top surface of base member 72.

Fuel gas dispersion chamber 76 is an airtight chamber provided above base member 72 to form a concentric circle with base member 72, on the top surface of which each individual fuel cell unit 16 is arrayed. On each individual fuel cell unit 16 attached to the top surface of fuel gas dispersion chamber 76, the fuel electrode on the inside thereof communicates with the interior of fuel gas dispersion chamber 76.

At the same time, a reform gas transport pipe 78 is placed to connect inside cylinder member 64 and the top surface of fuel gas dispersion chamber 76. Reform gas transport pipe 78 is a pipe extending in essentially a vertical direction from the inside top portion of inside cylinder member 64 to the top surface of fuel gas dispersion chamber 76. The top end of reform gas transport pipe 78 communicates with fuel gas supply flow path 20 between inside cylinder member 64 and outside cylinder member 66; the bottom end thereof penetrates through the top surface of fuel gas dispersion chamber 76 and extends into the interior of fuel gas dispersion chamber 76. Rising fuel gas inside fuel gas supply flow path 20 thus descends through reform gas transport pipe 78 and flows into fuel gas dispersion chamber 76. Fuel gas which has flowed into fuel gas dispersion chamber 76 is distributed to the fuel electrodes on each individual fuel cell unit 16.

In addition, a busbar 80 is attached at the center of base member 72 to penetrate base member 72. Busbar 80 is an elongated metal plate conductor for extracting power produced by fuel cell stack 14 to the outside of fuel cell housing container 8; it is attached to base member 72 via an insulator. Busbar 80 is electrically connected to collectors, described below, which are attached to each individual fuel cell unit 16 on the interior of fuel cell housing container 8. Busbar 80 is also connected outside fuel cell housing container 8 to an inverter 54 (FIG. 1).

A cylindrical cell stack temperature retaining insulation material 82 is attached to the top surface of base member 72 to surround fuel gas dispersion chamber 76. Cell stack temperature retaining insulation material 82 is a cylindrical insulating material constituted to surround the entirety of fuel gas dispersion chamber 76 and approximately the bottom ⅔ of fuel cell stack 14. The top approximately ⅓ of cell stack temperature retaining insulation material 82 is tapered so that the insulation material becomes gradually narrower toward the top end. By this arrangement, the heat insulating characteristics between fuel cell stack 14 and inside cylinder member 64 surrounding same decline gradually toward the top end of cell stack temperature retaining insulation material 82.

Next, referring again to FIGS. 4 and 5, we discuss the constitution of the combustion burner.

Figure 4:
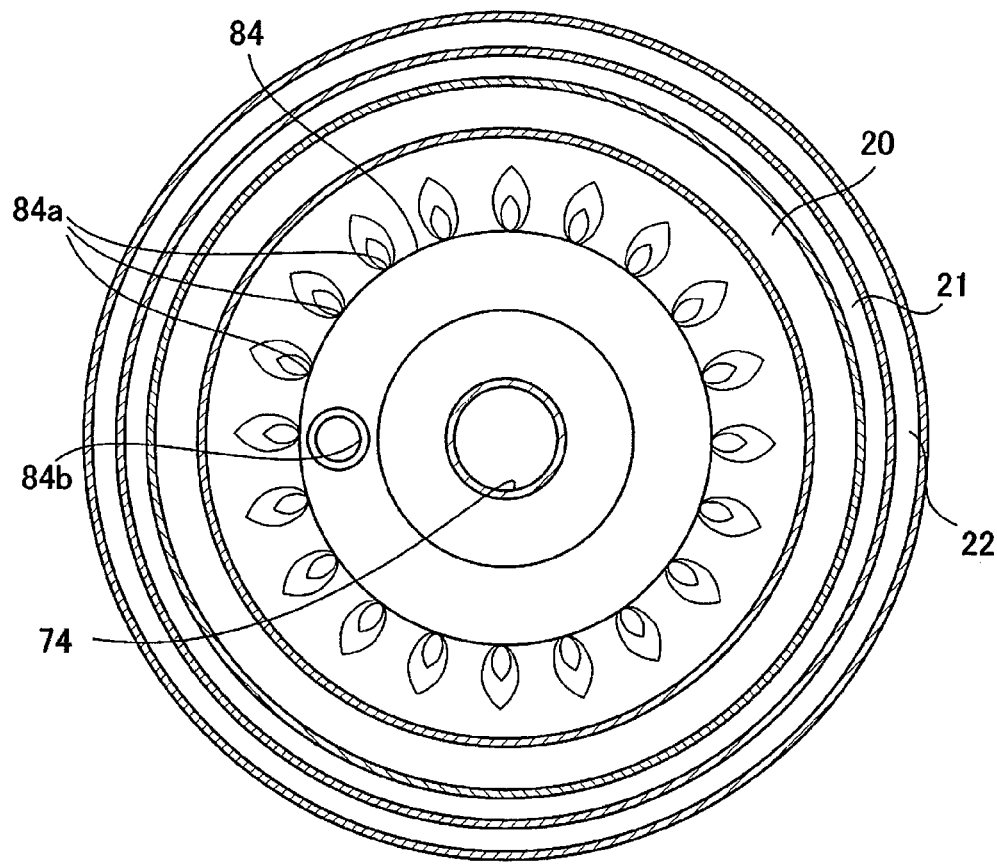
FIG. 4: A plan view sectional diagram along line IV-IV in FIG. 3.
Figure 5:
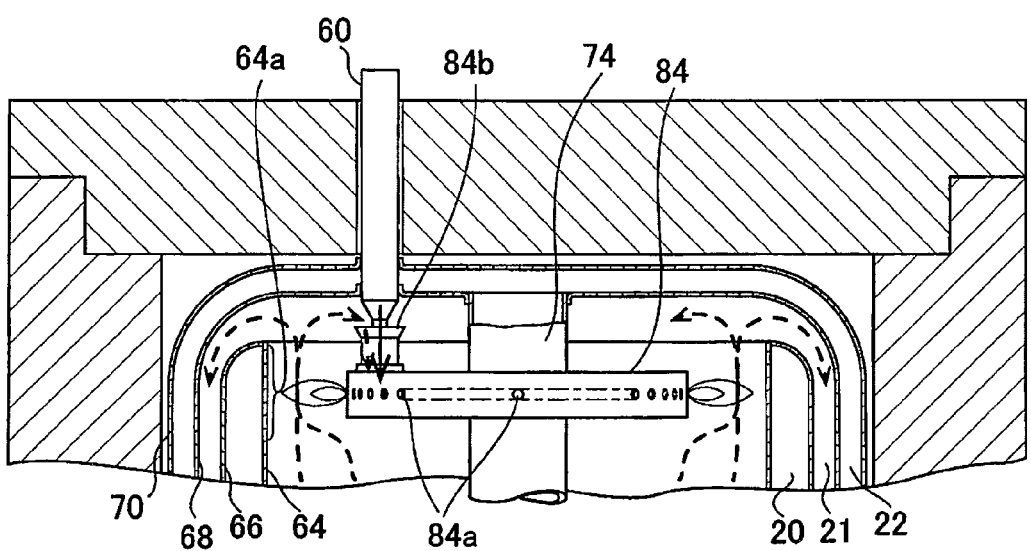
FIG. 5: A summary sectional diagram showing an enlarged top portion of a fuel cell housing container provided with a solid oxide fuel cell device according to an embodiment of the present invention.

FIG. 4 is a plan view sectional diagram along line IV-IV in FIG. 3. FIG. 5 is a summary sectional diagram showing an expanded view of the top portion of the fuel cell housing container.

As shown in FIGS. 3 through 5, combustion burner 84 is an approximately donut-shaped burner disposed at the top end portion inside fuel cell housing container 8; oxidant gas injecting pipe 74 passes through it on the center axis line thereof. Multiple gas injection ports 84a are provided on the outer circumferential portion of combustion burner 84; as shown in FIG. 4, a radially shaped flame is formed from combustion burner 84 in approximately a horizontal direction. An ejector 84b is provided on the top surface of combustion burner 84.

Ejector 84b is formed as an introducing port for introducing fuel gas into combustion burner 84; fuel gas is injected from the tip of burner gas supply pipe 60 toward this introducing port. Combustion gas injected from the tip of burner gas supply pipe 60 is introduced into combustion burner 84 as surrounding air and exhaust gas are drawn in. Combustion gas and air flowing into combustion burner 84 are mixed on the interior and injected from each of the gas injection ports 84a.

Ignition plug 3 (FIG. 3) is disposed so that its tip portion is positioned close to gas injection ports 84a; the mixed gas of fuel gas injected from gas injection ports 84a and air is ignited by generating a spark at the tip portion of ignition plug 62. The combustion burner 84 flame heats the top end portion of inside cylinder member 64, which faces gas injection ports 84a. The top end portion of inside cylinder member 64, heated by this combustion burner 84, functions as heating section 64a (FIG. 5).

Next, referring to FIG. 3, we discuss a structure for reforming raw fuel gas supplied from fuel supply source 30.

First, a vaporizing section 86 for vaporizing water for steam reforming is provided at the lower portion of fuel gas supply flow path 20, which is constituted by the space between inside cylinder member 64 and outside cylinder member 66. Vaporizing section 86 is formed of ring-shaped tilted plates 86a attached to the bottom inside circumference of outside cylinder member 66, and water supply pipe 88. Vaporizing section 86 is also disposed below oxidant gas introducing pipe 56 for introducing air for electrical generation, and above exhaust gas exhaust pipe 58, which discharges exhaust gas. Tilted plates 86a are thin metal plates formed in a ring shape; the outside circumferential edge thereof is attached to the inside wall surface of outside cylinder member 66. The inside circumferential edge thereof is positioned above the outside circumferential edge, and a gap is provided between the inside circumferential edge of tilted plates 86a and the inside circumferential edge of inside cylinder member 64.

Water supply pipe 88 is a pipe which penetrates base member 72 and extends vertically; water for steam reforming supplied from water flow volume regulator unit 28 is supplied to vaporizing section 86 via water supply pipe 88. The top end of water supply pipe 88 penetrates tilted plates 86a and extends up to the top surface side of tilted plates 86a; water supplied to the top surface side of tilted plates 86a accumulates between the top surface of tilted plates 86a and the inside wall surface of outside cylinder member 66. Water supplied to the top surface of tilted plates 86a is vaporized there to produce steam. Thus the top end portion of water supply pipe 88 functions as water introducing portion 88a.

Also, a fuel gas introducing portion for introducing fuel gas into fuel gas supply flow path 20 is placed at the bottom of vaporizing section 86. Raw fuel gas fed from fuel blower 38 is introduced into fuel gas supply flow path 20 via a fuel gas supply pipe 90. Fuel gas supply pipe 90 is a pipe which penetrates base member 72 and extends vertically; it is disposed close to water supply pipe 88. The top end of fuel gas supply pipe 90 is positioned below tilted plates 86a. Therefore the top end portion of fuel gas supply pipe 90 functions as a fuel gas introducing portion 90a. Raw fuel gas fed from fuel blower 38 is introduced at the bottom side of tilted plates 86a and rises to the top side of tilted plates 86a as its flow path is constricted by the inclination of tilted plates 86a. Raw fuel gas rising to the top side of tilted plates 86a rises together with the steam produced by vaporizing section 86.

A mixing section 92 is erected at the top of vaporizing section 86 inside fuel gas supply flow path 20. Mixing section 92 comprises three helical blades 92a attached to the outside wall surface of inside cylinder member 64. Each helical blade 92a is constituted by a C-shaped thin plate which rotates approximately one rotation around inside cylinder member 64; these plates are attached to the outside wall surface of inside cylinder member 64 to form helical shapes. The outside circumferential edge of each of the helical blades 92a extends close to the inside wall surface of outside cylinder member 66, therefore an approximately helical-shaped flow path is formed by helical blades 92a on the inside of fuel gas supply flow path 20. The raw fuel gas introduced from fuel gas introducing portion 90a and the steam produced in vaporizing section 86 are fully mixed by passing through this helical flow path.

A reforming section 94 is furthermore provided over mixing section 92 in fuel gas supply flow path 20 and beneath heating section 64a (FIG. 5) at the top end of fuel gas supply flow path 20. Reformer section 94 is disposed to surround the top portion of fuel cell stack 14 and the circumference of combustion chamber 18 thereabove. Reformer section 94 comprises six catalyst holding helical plates 94a attached to the outside wall surface of inside cylinder member 64, two catalyst holding air passage plates 94b, and a reforming catalyst 96 held by the above. Each catalyst holding helical plate 94a is constituted by a C-shaped thin plate which rotates approximately one rotation around inside cylinder member 64; these plates is attached to the outside wall surface of inside cylinder member 64 to form helical shapes Since the outside circumferential edge of each catalyst holding helical plate 94a extends to the inside wall surface of outside cylinder member 66, an approximately helical-shaped flow path is formed by each of the catalyst holding helical plates 94a on the inside of fuel gas supply flow path 20. A large number of fine holes is provided in each of the catalyst holding air passage plates 94b so that air passage is secured. The size of those fine holes is of a degree able to secure sufficient porosity to prevent reforming catalyst 96 from passing through, while allowing fuel gas and steam to flow into and out of reforming section 94. Reforming catalyst 96 is filled in to the above-described catalyst holding helical plates 94a and the interior of each catalyst holding air passage plate 94b.

Thus when raw fuel gas and steam mixed in mixing section 92 contact the reforming catalyst 96 filled into reforming section 94, the steam reforming reaction SR shown in Formula (1) proceeds inside reforming section 94.

$$C_mH_n + xH_2O \rightarrow aCO_2 + bCO + cH_2 \tag{1}$$

Fuel gas reformed in reforming section 94 flows downward through reform gas transport pipe 78, flows into fuel gas dispersion chamber 76, and is supplied to each individual fuel cell unit 16. Note that while steam reforming reaction Sr is an endothermic reaction, the heat required for the reaction is supplied by the heat conducted from heating section 64a (FIG. 5) heated by combustion burner 84, the combustion heat produced in combustion chamber 18, and the electrical generation heat generated in fuel cell stack 14.

Figure 6:
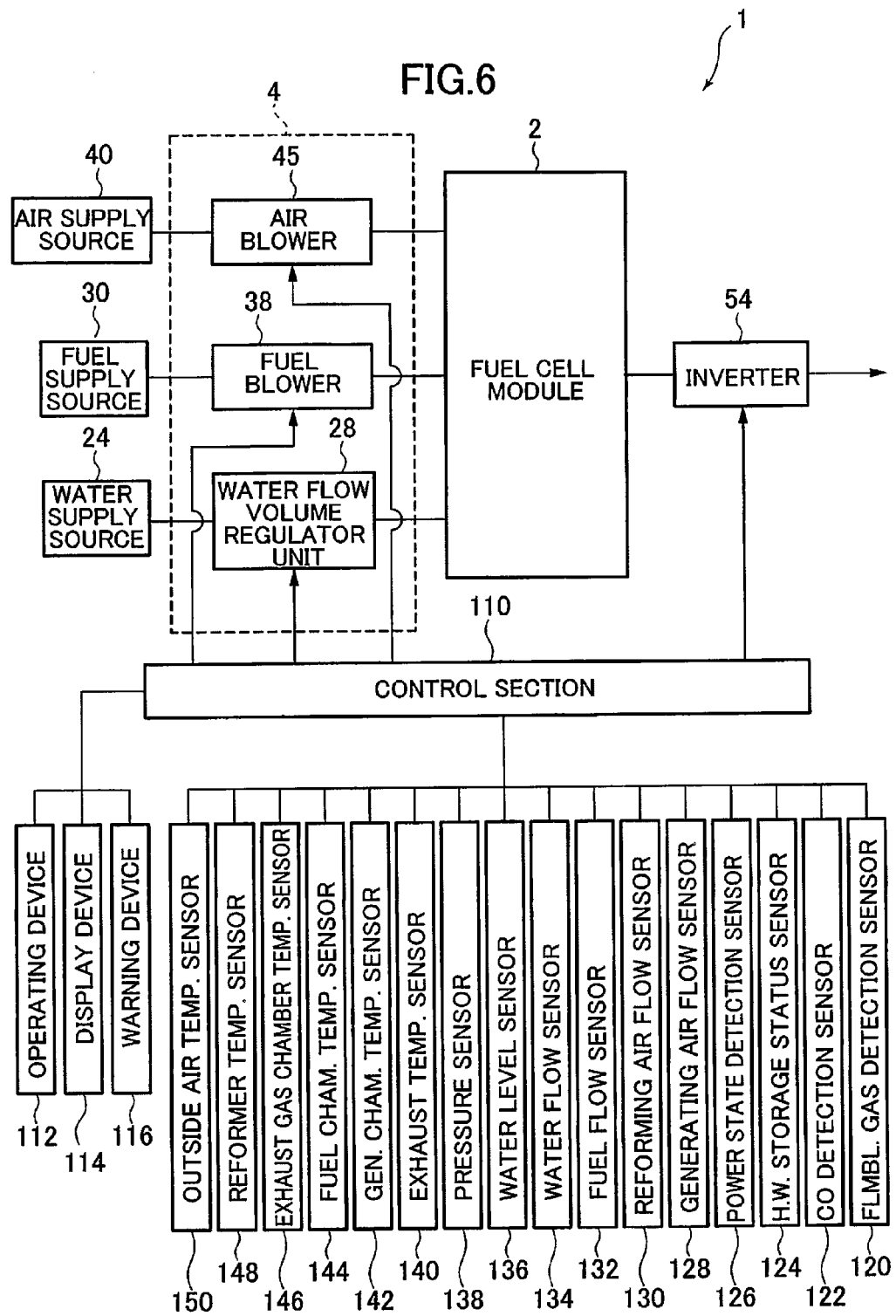
FIG. 6: A block diagram showing a solid oxide fuel cell device according to an embodiment of the present invention.

Next, referring to FIG. 6, we discuss sensors and the like supplied with the solid oxide fuel cell device (SOFC) according to the present embodiment. FIG. 6 is a block diagram showing solid oxide fuel cell 1 (SOFC) according to an embodiment of the present invention.

As shown in FIG. 6, solid oxide fuel cell 1 is furnished with a control section 110; connected to this control section 110 are an operating device 112 provided with operating buttons for user operation, such as "ON," "OFF," etc., a display device 114 for displaying various data such as electrical generation output values (Watts), and a warning device 116 for issuing alarms (warnings) for anomalous states, etc. Note that this notification device 116 may also be connected to a remote control center to inform the control center of abnormal states. Also built into control section 110 are a microcomputer, memory, and programs to run same (these are not shown), through which each of the devices connected to control section 110 are controlled.

Next, signals from the various sensors described below are input to control unit 110.

First, flammable gas detection sensor 120 is for detecting gas leaks, and is attached to fuel cell module 2 and auxiliary unit 4.

The purpose of flammable gas detection sensor 120 is to detect whether CO in the exhaust gas, which is supposed to be discharged outside via exhaust gas conduit 80, has leaked into the external housing (not shown) which covers fuel cell module 2 and auxiliary unit 4.

A water reservoir state detection sensor 124 detects the temperature and amount of hot water in the water heater (not shown).

An electrical power state detection sensor 126 detects current, voltage, and the like in inverter 54 and in a distribution panel (not shown).

A generator air flow detection sensor 128 detects the flow volume of generating air supplied to generating chamber 10.

A reforming air flow volume sensor 130 detects the volume of reforming air flow supplied to reformer 20.

A fuel flow volume sensor 132 detects the flow volume of fuel gas supplied to reformer 20.

A water flow volume sensor 134 detects the flow volume of pure water supplied to reformer 20.

A water level sensor 136 detects the water level in pure water tank 26.

A pressure sensor 138 detects pressure on the upstream side outside reforming section 94.

An exhaust temperature sensor 140 detects the temperature of exhaust gas flowing into hot water producing device 50.

Generating chamber temperature sensors 142 have the purpose of detecting the temperature near fuel cell stack 14 to estimate the temperature of fuel cell stack 14.

A combustion chamber temperature sensor 144 detects the temperature in combustion chamber 18.

An exhaust gas chamber temperature sensor 146 detects the temperature of exhaust gases flowing inside exhaust gas discharge flow path 21.

A reformer temperature sensor 148 detects the temperature of reforming section 94 and calculates the reforming section 94 temperature from the intake and exit temperatures on reforming section 94.

If the solid oxide fuel cell (SOFC) is placed outdoors, outside temperature sensor 150 detects the temperature of the outside atmosphere. Sensors to detect outside atmospheric humidity and the like may also be provided.

Signals from these various sensor types are sent to control unit 110; control unit 110 sends control signals to water flow regulator unit 28, fuel blower 38, reforming air flow regulator unit 44, and generating air flow regulator unit 45 based on data from the sensors, and controls the flow volumes in each of these units.

Figure 7:
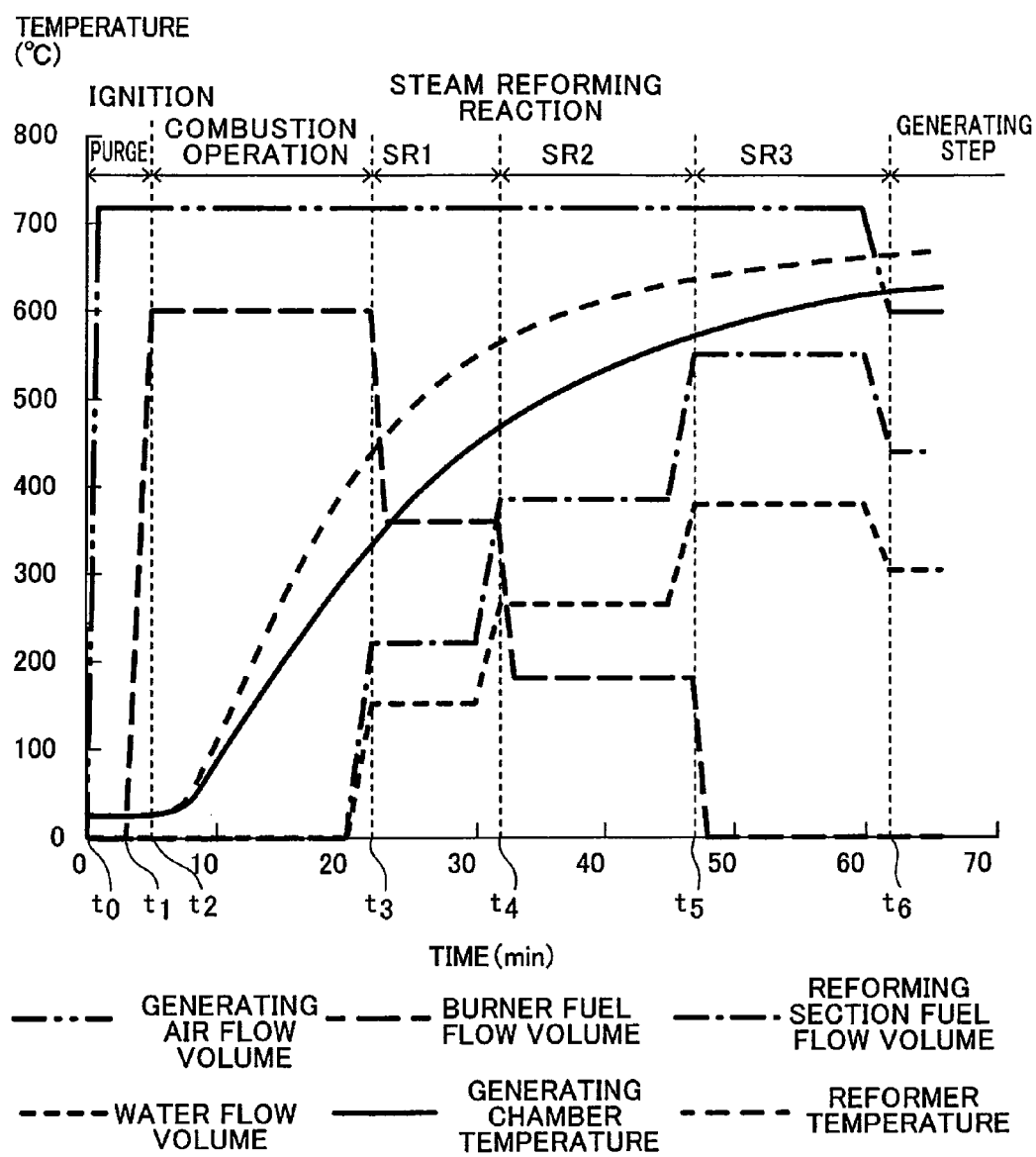
FIG. 7: A timing chart showing the operation at the time of startup of a solid oxide fuel cell according to an embodiment of the present invention.

Next, referring to FIG. 7, we discuss the operation of solid oxide fuel cell 1 (SOFC) according to the present embodiment at the time of startup. FIG. 7 is a timing chart showing the operation at startup of a solid oxide fuel cell (SOFC) according to an embodiment of the present invention; it shows the temperature trends in the temperature of generating chamber 10, which reflects the temperature of fuel cell stack 14, and in the temperature of reforming section 94. In addition to these temperatures, FIG. 7 shows the supply flow volume of generating air, the supply flow volume of fuel gas to the combustion burner 84, the supply flow volume of fuel gas to reforming section 94, and the supply flow volume of water to vaporizing section 86, but what is shown is a schematic view of the increasing or decreasing trends in each of these supply flow volumes, not specific supply volumes.

Upon startup of solid oxide fuel cell 1, a startup step is executed to raise the temperature of fuel cell stack 14 inside fuel cell module 2 to one at which electrical generation is possible. During this startup step there is no extraction of electrical power to inverter 54 from fuel cell module 2. Therefore fuel cell module 2 does not generate electricity in the startup step.

First, at time t1 in FIG. 7, generating air flow regulator unit 45 is started by control section 110, and the supply of air to fuel cell module 2 is begun. Supplied air flows into oxidant gas supply fuel path 22 from oxidant gas introducing pipe 56, and after flowing toward the top inside oxidant gas supply fuel path 22, flows into oxidant gas injecting pipe 74. Air flowing into oxidant gas injecting pipe 74 drops down and is blown from oxidant gas injecting pipe 74 injection ports 74a onto the lower portion of each individual fuel cell unit 16 disposed to surround oxidant gas injecting pipe 74. Air blown onto the lower portion of each individual fuel cell unit 16 flows up through generating chamber 10 and into combustion chamber 18 through the annular space between combustion burner 84 and the inside wall surface of inside cylinder member 64, reaching the ceiling surface of inside cylinder container 68. Air reaching the ceiling surface of inside cylinder container 68 flows in a radiating direction into exhaust gas discharge flow path 21 formed between inside cylinder container 68 and outside cylinder member 66.

Air flowing into exhaust gas discharge flow path 21 drops down and is discharged from exhaust gas exhaust pipe 58 to outside fuel cell module 2. Gases accumulated inside fuel cell module 2 generating chamber 10 and combustion chamber 18 are thus discharged to outside fuel cell module 2.

Next, fuel blower 38 is started by control section 110 at time t1. Starting of fuel blower 38 causes raw fuel gas supplied from fuel supply source 30 to be fed into proportional valve 32. At time t1, proportional valve 32 is set to a state whereby all supplied raw fuel gas is fed to combustion burner 84. Therefore raw fuel gas flowing out from proportional valve 32 flows into burner gas supply pipe 60. Raw fuel gas flowing into burner gas supply pipe 60 is injected from the bottom end thereof toward combustion burner 84 ejector 84b. Raw fuel gas injected at ejector 84b, pulling in air, flows into the interior of combustion burner 84 together with that air. Raw fuel gas flowing into combustion burner 84 is radially ejected in approximately the horizontal direction from each of the gas injection ports 84a thereon.

In addition, a signal is sent at time t2 to ignition plug 62 by control section 110, igniting raw fuel gas being injected from gas injection ports 84a. A combustion operation, in which the temperature inside fuel cell module 2 is made to rise by the heat of combustion from combustion burner 84, is thus started. The flame in combustion burner 84 heats heating section 64a, which is the top end portion of inside cylinder member 64, disposed to face the outside circumferential surface of combustion burner 84. When heating section 64a is heated, the temperature of the entire inside cylinder member 64 rises due to thermal conduction, and the temperature of outside cylinder member 66, joined to inside cylinder member 64, also rises. Thus the inside reforming section 94 of reforming catalyst 96, which is disposed between inside cylinder member 64 and outside cylinder member 66, is also heated and rises in temperature.

The temperature inside generating chamber 10, surrounded by inside cylinder member 64 and inside combustion chamber 18, also rises. In addition, high temperature combustion gas produced by combustion burner 84 passes through the air between combustion burner 84 and inside cylinder member 64 and into exhaust gas discharge flow path 21. I.e., exhaust gas produced by combustion passes through exhaust gas discharge flow path 21 between outside cylinder member 66 and inside cylinder container 68 and is discharged. At this point, reforming section 94 erected on the inside of outside cylinder member 66 is heated by the surrounding area, thereby heating the air flowing through oxidant gas supply fuel path 22 erected on the outside of inside cylinder container 68. This causes the temperature of air flowing through oxidant gas injecting pipe 74 and into generating chamber 10 to also rise, as does the temperature inside generating chamber 10. As a result of these actions, the temperature inside generating chamber 10 and the temperature of reforming section 94 rise at time t2 and later.

When the temperature of reforming section 94 rises sufficiently, control section 110 begins the supply of fuel gas and steam to reforming section 94 at time t3. This causes an SR1 step to be started, in which steam reforming reaction SR is caused to occur in reforming section 94 as the inside of fuel cell module 2 is heated by the combustion heat of combustion burner 84. Specifically, the settings on proportional valve 32 are changed by control section 110, and inflowing raw fuel gas is supplied to combustion burner 84 and reforming section 94. Also, water flow volume regulator unit 28 is started by control section 110, and supplying of water to vaporizing section 86 is begun.

By changing the settings on proportional valve 32, raw fuel gas flowing into proportional valve 32 is supplied to desulfurizer 32 as well as combustion burner 84. At this point, the sulfur portion is removed from the raw fuel gas flowing into desulfurizer 32. Note that at time t3 the temperature of the catalyst (not shown) inside the desulfurizer 32 disposed to surround fuel cell housing container 8 has risen to a temperature at which desulfurization is possible, and the sulfur portion can be fully removed. The temperature of raw fuel gas flowing out from desulfurizer 32 is lowered by heat exchanger 34, and flows into fuel cell housing container 8 through electromagnetic valve 35. Note that degradation of the next connected electromagnetic valve 35 is prevented by reducing the temperature of raw fuel gas flowing out from desulfurizer 32 using heat exchanger 34.

Raw fuel gas which has passed through electromagnetic valve 35 flows into fuel gas supply flow path 20 from the fuel gas introducing portion 90a at the tip of fuel gas supply pipe 90. The heating section 64a at the top end of the interior of fuel gas supply flow path 20 is heated, therefore the top portion thereof is in a high-temperature state. Since the exhaust gas exhaust pipe 58 of exhaust gas discharge flow path 21 is placed above fuel gas introducing portion 90a, the parts up to the area above fuel gas introducing portion 90a are heated by exhaust gas heat, so that the temperature above fuel gas introducing portion 90a is high. There is hence a rising current inside fuel gas supply flow path 20, so that raw fuel gas flowing in from fuel gas introducing portion 90a rises together with the rising current. At this point the raw fuel gas flow path is constricted to be narrower at the top by tilted plates 86a, raising the flow velocity of the raw fuel gas here.

At the same time, reforming water fed by water flow volume regulator unit 28 flows out from water introducing portion 88a at the tip of water supply pipe 88 and onto the surface at the top side of tilted plates 86a. Here the outside of outside cylinder member 66, attached to tilted plates 86a, is the exhaust gas discharge flow path 21, and the high temperature exhaust gas which has heated reforming section 94 above flows down to the perimeter of tilted plates 86a. Because of the flow of high temperature exhaust gas, the temperatures of the tilted plates 86a and proximate outside cylinder member 66 which together constitute vaporizing section 86 are also rising so that water flowing in from water introducing portion 88a to vaporizing section 86 is vaporized and steam produced. Note that exhaust gas flowing down inside exhaust gas discharge flow path 21 is declining in temperature due to the heating of reforming section 94 at the top, but because heat vaporizing section 86 need not be heated to as high a temperature as reforming section 94, heating can also be sufficiently accomplished using exhaust gas after heating reforming section 94. While it is true that vaporizing section 86 also receives heat from the side of fuel cell stack 14, the cell stack temperature retaining insulation material 82 is disposed between fuel cell stack 14 and vaporizing section 86, therefore vaporizing section 86 is primarily heated by heat from exhaust gas discharge flow path 21.

Exhaust gas exhaust pipe 58 for discharging exhaust gas is disposed beneath the vaporizing section 86, therefore exhaust gas is discharged from exhaust gas exhaust pipe 58 after heating vaporizing section 86. Vaporizing section 86 is sufficiently heated by the exhaust gas heat flowing inside exhaust gas discharge flow path 21. Also, vaporizing section 86 is disposed below oxidant gas introducing pipe 56 for introducing generating air. It is therefore difficult for heat to be removed by air flowing inside oxidant gas supply fuel path 22 in the portion of exhaust gas discharge flow path 21 surrounding vaporizing section 86, and vaporizing section 86 is reliably heated by exhaust gas heat.

Here fuel gas introducing portion 90a and water introducing portion 88a are disposed in proximity to one another. For this reason raw fuel gas flowing in from fuel gas introducing portion 90a and rising from the space between the inside circumferential edge of tilted plates 86a and the outside wall surface of inside cylinder member 64 is introduced from water introducing portion 88a and rises together with the rising current within fuel gas supply flow path 20 as it instantly mixes with steam vaporized in the vicinity of the water introducing portion 88*a* at the top surface of tilted plates 86*a*. Raw fuel gas and steam reach the mixing section 92 disposed over vaporizing section 86 and rise along the helical flow paths formed by each of the helical blades 92*a* as they encircle inside cylinder member 64. The raw fuel gas and steam are fully mixed by rising as they circulate through the helical flow path.

Raw fuel gas and steam, fully mixed in mixing section 92, then further rise and reach reforming section 94 disposed above mixing section 92. In reforming section 94, the raw fuel gas and steam flow in a helical shape along the catalyst-holding helical plates 94*a* disposed to form a helix, and here contact reforming catalyst 96. This causes the steam reforming reaction SR shown in Formula (1) above, reforming raw fuel gas into fuel gas containing abundant oxygen.

Fuel gas reformed in reforming section 94 flows downward through reform gas transport pipe 78 and into fuel gas dispersion chamber 76. Fuel gas flowing into fuel gas dispersion chamber 76 then flows into the inside fuel electrode in each individual fuel cell unit 16 disposed on the top surface of fuel gas dispersion chamber 76.

Fuel gas flowing into the fuel electrode rises inside each individual fuel cell unit 16 and flows out from the top end of each individual fuel cell unit 16. At time t3 the temperature has risen sufficiently inside generating chamber 10, therefore fuel gas which has flowed out of the top end of each individual fuel cell unit 16 is combusted and a flame is formed at the top end of each individual fuel cell unit 16. Reforming section 94, which is disposed to surround combustion chamber 18, is also heated by the combustion heat of fuel gas in combustion chamber 18 above each individual fuel cell unit 16.

As described above, the steam reforming reaction SR generated inside reforming section 94 is an endothermic reaction, however the heat required for this reaction is sufficiently supplied by the heating of heating section 64*a* by combustion burner 84, the combustion heat inside combustion chamber 18, and the exhaust heat from combustion chamber 18 flowing through exhaust gas discharge flow path 21 around reforming section 94.

When the temperature inside fuel cell module 2 rises to a predetermined temperature, control section 110 starts the SR2step at time t4. In the SR2step, the setting on proportional valve 32 is changed by control section 110 and the volume of fuel gas supplied to combustion burner 84 is reduced, while on the other hand the volume of fuel gas to reforming section 94 is increased. The volume of water supplied to vaporizing section 86 by water flow volume regulator unit 28 is also increased. Heating by combustion burner 84 is thus reduced, and heating by the heat of combustion of fuel gas flowing from the top end of each individual fuel cell unit 16 is increased.

When the temperature inside fuel cell module 2 further rises to a predetermined temperature, control section 110 starts the SR3step at time t5. In the SR3step, the setting on proportional valve 32 is changed by control section 110 and the supply of fuel gas to combustion burner 84 is stopped, while on the other hand the volume of fuel gas to reforming section 94 is increased. The volume of water supplied to vaporizing section 86 by water flow volume regulator unit 28 is also increased. Heating by combustion burner 84 is thus stopped, and heating is performed by only the heat of combustion of fuel gas flowing out from the top end of individual fuel cell units 16.

In addition, when the temperature of fuel cell stack 14 reaches the temperature at which electrical generation is possible, control section 110 ends the startup step and begins the electrical generating step. Specifically, fuel cell module 2 is connected to inverter 54 by control section 110, and electrical current is extracted to inverter 54 via busbar 80. An electrical generation reaction thus occurs between the fuel gas flowing on the fuel electrode side (inside) of the individual fuel cell units 16 and the air flowing on the air electrode side (outside), and electrical power is produced. Note that in the electrical generating step the fuel gas supply flow volume, water supply flow volume, and generating air flow volume are determined according to the amount of electrical generation required. In solid oxide fuel cell 1 of the present embodiment, the fuel gas supply flow volume, water supply flow volume, and generating air flow volume are set to be more than each of the flow volumes required to produce the maximum rated electrical power. Therefore when transitioning from the SR3 step to the electrical generation step, the fuel gas supply flow volume, water supply flow volume, and air flow volume are decreased.

In the electrical generating step, electrical generating heat is produced in each individual fuel cell unit 16. Therefore the interior of fuel cell module 2 is also heated by the electrical generation heat of each individual fuel cell unit 16. In particular, reforming section 94, which is disposed to surround the perimeter of the top portion of fuel cell stack 14, is heated by electrical generation heat. Therefore during the electrical generating step, as well, the temperature of the top portion of fuel gas supply flow path 20 rises and the temperature of the bottom portion thereof declines; a rising current is produced on the inside thereof and supplied raw fuel gas can be easily fed upward.

There is a tendency for the temperature inside generating chamber 10 to be high in the top portion and low in the bottom portion since the top portion is heated by the combustion heat in combustion chamber 18; this leads to a tendency for temperature unevenness to also occur between the top portion and bottom portion in each individual fuel cell unit 16.

In solid oxide fuel cell 1 of the present embodiment, however, the bottom portion of fuel cell stack 14 is enveloped by cell stack temperature retaining insulation material 82, therefore the electrical generation heat produced in the bottom portion of each individual fuel cell unit 16 has difficulty migrating to the surrounding inside cylinder member 64 (fuel gas supply flow path 20), and the temperature of the bottom portion of each individual fuel cell unit 16 is maintained. On the other hand, the top portions of each individual fuel cell unit 16, where the temperature can easily rise, directly oppose reforming section 94, inside of which an endothermic reaction is occurring, so that electrical generation heat can be easily carried off to the surroundings. Temperature unevenness between the top portion and the bottom portion of each individual fuel cell unit 16 is thus restrained.

Moreover, cell stack temperature retaining insulation material 82, which surrounds fuel cell stack 14, is formed to become gradually thinner towards the top end. Thus in each individual fuel cell unit 16 the occurrence of temperature unevenness caused by sudden changes in heat insulation properties between the portion surrounded by cell stack temperature retaining insulation material 82 and the portion not surrounded is restrained. Also, in solid oxide fuel cell 1 of the present embodiment the inside diameter of the bottom portion of inside cylinder member 64 is formed to be large and the inside diameter of the top portion thereof is formed to be small. Therefore in the bottom portion of fuel cell stack 14, the distance from fuel cell stack 14 up to the surrounding inside cylinder member 64 is far, and in the top portion the distance up to inside cylinder member 64 is close, and the lower the location, the further is the distance from the fuel cell stack to the inside cylinder member 64. Thus it becomes more difficult for fuel gas supply flow path 20 to receive the heat of fuel cell stack 14 from the bottom portion of fuel cell stack 14 than from the top portion of fuel cell stack 14. Stated differently, it is difficult for the heat of electrical generation to be removed at the bottom portion of fuel cell stack 14, and temperature unevenness between the top portion and the bottom portion of each individual fuel cell unit 16 is restrained.

Also, in solid oxide fuel cell 1 of the present embodiment, after electrical generating air is injected in a radial shape from oxidant gas injecting pipe 74 disposed at the center of fuel cell stack 14 and rises inside generating chamber 10, it flows into exhaust gas discharge flow path 21 from the top end edge of inside cylinder member 64. Therefore the flow of air inside generating chamber 10 and combustion chamber 18 is essentially completely axially symmetrical, and air flows without unevenness around each of the individual fuel cell units 16 which constitute fuel cell stack 14. Temperature differences between each individual fuel cell unit 16 are thus restrained, and a uniform starting power can be generated in each individual fuel cell unit 16.

Figure 8A:
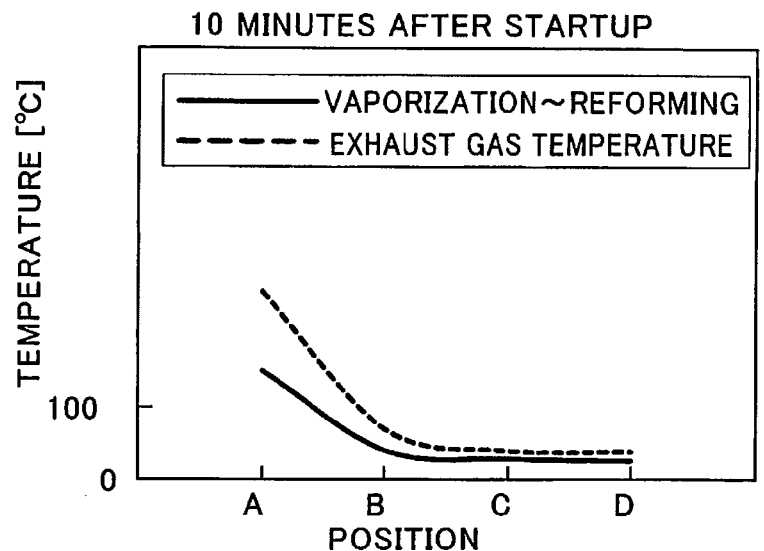
FIGS. 8(a)-8(c): Graphs showing, at various positions, temperatures inside the fuel gas supply flow path, and temperatures inside the exhaust gas exhaust flow path, depicting the respective temperatures (a) 10 minutes after startup; (b) 20 minutes after startup; and (c) 30 minutes after startup.
Figure 8B:
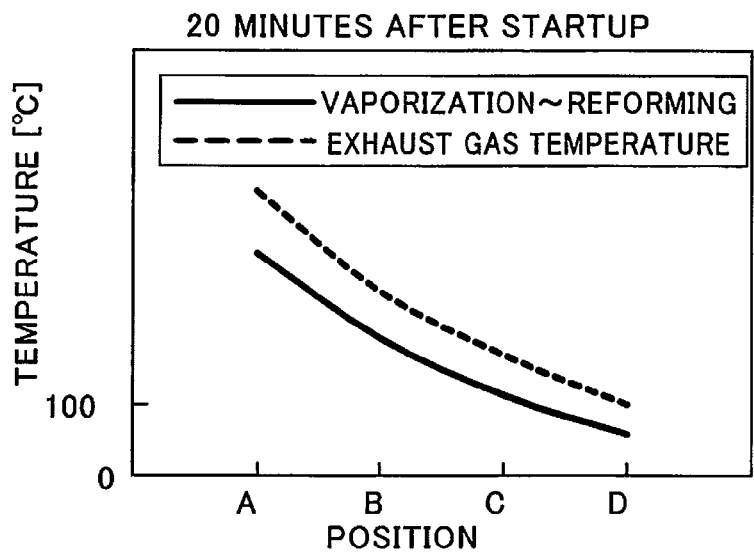
Figure 8C:
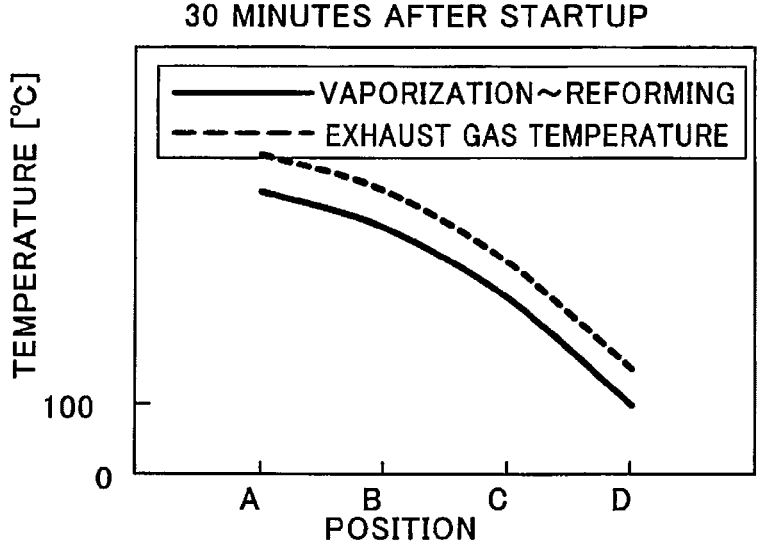

Next, referring to FIG. 8, we discuss the temperature distribution within fuel cell housing container 8 during the startup step. FIGS. 8(a) through (c) are graphs showing the temperatures inside fuel gas supply flow path 20 and inside exhaust gas discharge flow path 21 at positions A, B, C, and D shown in FIG. 3; the temperature inside fuel gas supply flow path 20 is shown by a solid line and the temperature inside exhaust gas discharge flow path 21 by a dotted line. FIG. 8(a) shows the temperature distribution 10 minutes after startup; (b) shows it 20 minutes after startup; and (c) shows it 30 minutes after startup. As shown in FIG. 3, position A is close to the top end portion of fuel cell housing container 8; position A in fuel gas supply flow path 20 is close to heating section 64a, and position A in exhaust gas discharge flow path 21 is close to the entrance of exhaust gas discharge flow path 21. Position B corresponds to the part inside fuel gas supply flow path 20 where reforming section 94 is formed. Position C corresponds to the part between mixing section 92 and reforming section 94. Position D corresponds to the part inside fuel gas supply flow path 20 where vaporizing section 86 is formed.

Figure 10:
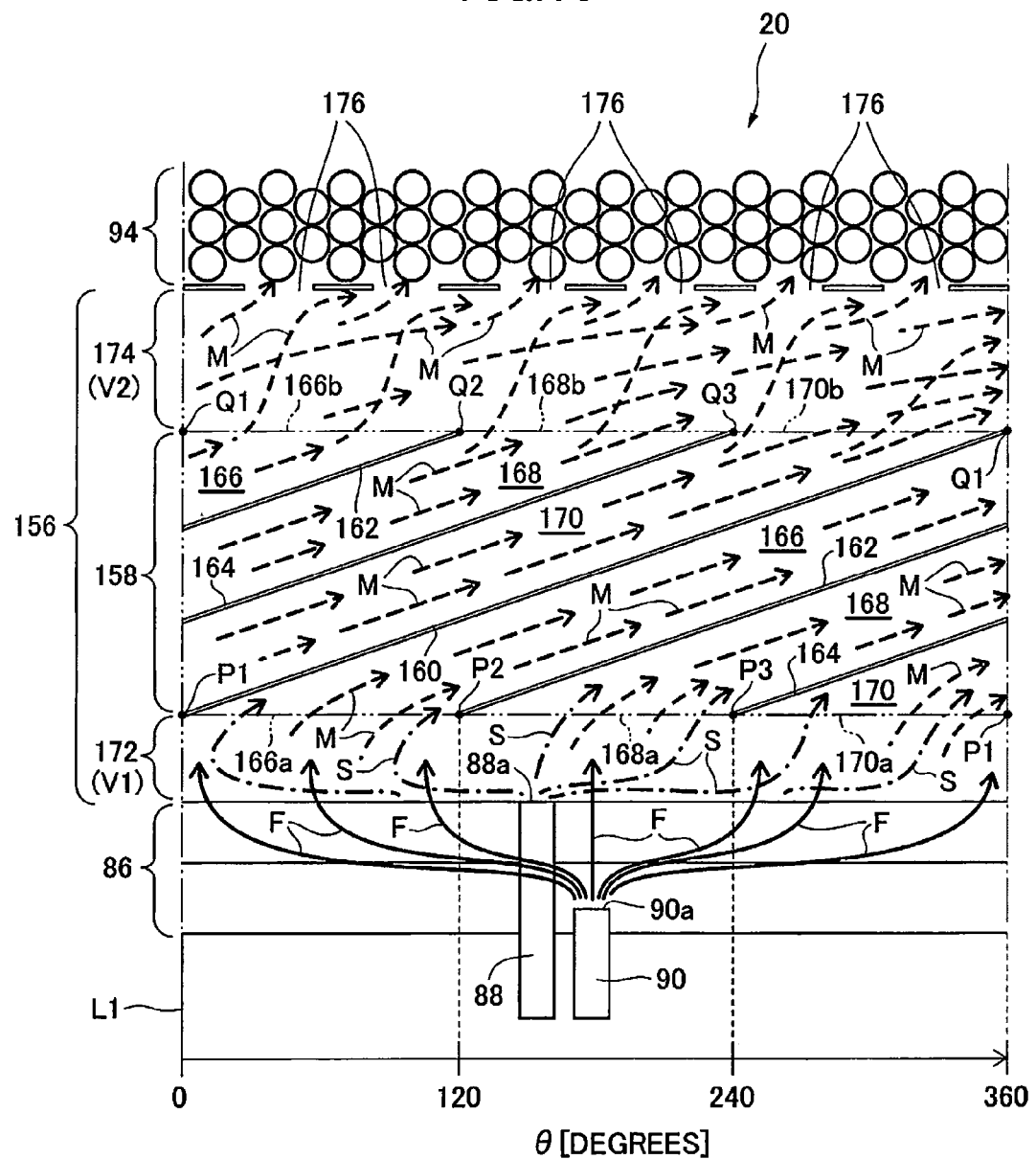
FIG. 10: A summary diagram along the outer circumference of an inside cylinder member pertaining to the fuel gas supply flow path formed between an inside cylinder member and an outside cylinder member in a solid oxide fuel cell according to an embodiment of the present invention.

First, as shown in FIG. 8(a), 10 minutes after startup the temperature at position A is rising close to heating section 64a, which is being heated by combustion burner 84, but the temperature is at lower positions B through D are not rising much. The temperature inside exhaust gas discharge flow path 21 shown by the dotted line is higher than the temperature inside fuel gas supply flow path 20 shown by the solid line.

Next, as shown in FIG. 8(b), at 20 minutes after startup the heat at position A close to heating section 64a is conducted to lower positions B and C, where the temperature is rising, and the temperature of reforming section 94 is beginning to rise. In contrast, the temperature at position D is not rising very much.

As is clear from FIG. 8(b), the temperature inside exhaust gas discharge flow path 21 is higher than the temperature inside fuel gas supply flow path 20, and the fuel gas, water, and reforming catalyst 96 inside fuel gas supply flow path 20 are heated by the exhaust gas flowing inside exhaust gas discharge flow path 21. In FIG. 8(b) the temperature at position D inside fuel gas supply flow path 20 has risen to approximately 100° C., and the production of steam inside vaporizing section 86 is possible.

Furthermore, as shown in FIG. 8(c), it is clear that at 30 minutes after startup the temperature at position B is approaching that at position A, and reforming catalyst 96 is fully heated. As is clearly shown in FIGS. 8(b) and (c), the temperature inside fuel gas supply flow path 20 increases with height, and the rising current produced by this causes fuel gas to rise inside fuel gas supply flow path 20 to be fed into reforming section 94, even without being pressured very much by a blower or the like. Steam generated in vaporizing section 86 is also fed into reforming section 94 by the rising current as it is mixed with fuel gas. Thus within fuel gas supply flow path 20 a large temperature slope is produced, but on the other hand temperature unevenness between the top portion and bottom portion of fuel cell stack 14 surrounded by fuel gas supply flow path 20 is restrained as described above.

Figure 9:
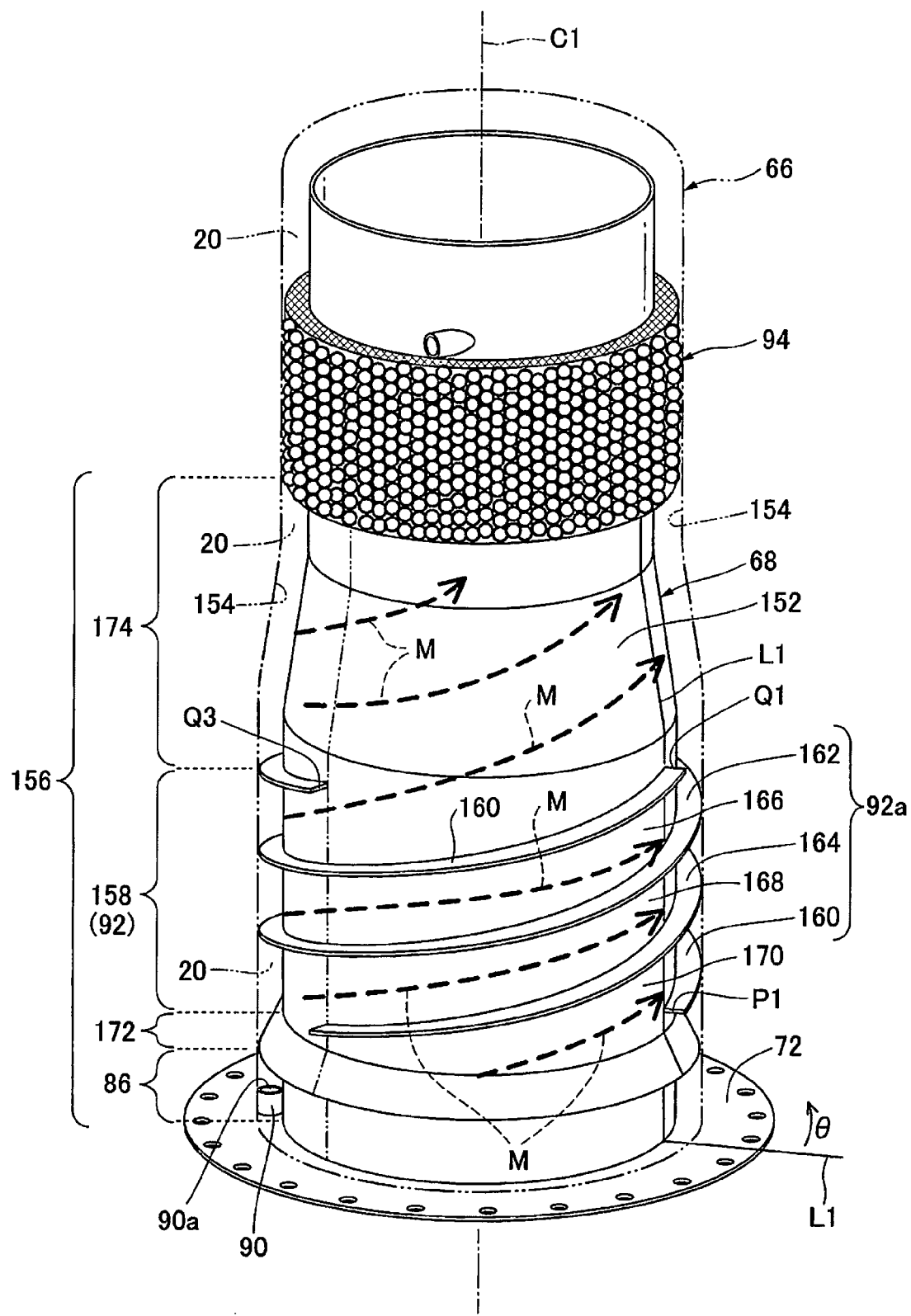
FIG. 9: A perspective view showing the structure inside a fuel gas supply flow path formed between an inside cylinder member and an outside cylinder member in a solid oxide fuel cell according to an embodiment of the present invention.

Next, referring to FIGS. 3, 9, and 10, we discuss in further detail the structure inside a fuel gas supply flow path formed between an inside cylinder member and an outside cylinder member in a solid oxide fuel cell according to an embodiment of the present invention.

FIG. 9 is a perspective view showing the structure inside a fuel gas supply flow path formed between the outside wall surface of an inside cylinder member and the inside wall surface of an outside cylinder member in a solid oxide fuel cell according to an embodiment of the present invention; FIG. 10 is a summary diagram along the outer circumferential direction of an inside cylinder member relative to a fuel gas supply flow path formed between an inside cylinder member and an outside cylinder member in a solid oxide fuel cell according to an embodiment of the present invention.

Here FIG. 10 slices through a predetermined cutout line L1 extending in the vertical direction, showing the outer circumferential direction of inside cylinder member 64 with respect to the outside wall surface 152 of the inside cylinder member 64 shown in FIG. 9. Letting θ (degrees) be the angle in the counterclockwise direction from cutaway line L1 as seen from above in FIG. 9, centered on center line axis C1 of inside cylinder member 64 shown in FIG. 9 (i.e., equal to the circumferential angle of the outside wall surface 152 of inside cylinder member 64), what is shown is one revolution around the outside wall surface 152 of inside cylinder member 64—i.e., from an angle θ of 0 to 360 degrees.

As shown in FIGS. 9 and 10, a circulating flow path portion 156 is provided between vaporizing section 86 and reforming section 94 in the fuel gas supply flow path 20 formed between inside cylinder member 64 outside wall surface 152 and outside cylinder member 66 inside wall surface 154; this circulating flow path portion 156 causes rising raw fuel gas F, introduced into fuel gas supply flow path 20 from fuel gas supply pipe 90 fuel gas introducing portion 90a, and rising steam S, introduced from water supply pipe 88 water introducing portion 88a and produced in vaporizing section 86, to circulate along the circumferential direction of fuel gas supply flow path 20, so that a flow (mixed current) M can be formed to supply mixed raw fuel gas and steam over the entire circumference of reforming section 94.

More concretely, circulating flow path portion 156 is furnished with a helical flow path portion 158 forming a helical flow path for circulating rising raw fuel gas F introduced into fuel gas supply flow path 20 from fuel gas introducing portion 90a, and rising steam S produced by vaporizing section 86, along the circumferential direction of fuel gas supply flow path 20. This helical flow path portion 158 in substance corresponds to the above-described mixing section 92, and is furnished with three helical blades 92a formed of C-shaped thin plates making approximately one revolution around inside cylinder member 64.

As shown in FIGS. 9 and 10, these three helical blades 92a are comprised of a first helical blade 160, a second helical blade 162, and a third helical blade 164; position P1 at the bottom edge of first helical blade 160 is most proximate to line L1 out of the three first helical blades 160, 162, and 164, and position Q1 on the top edge of first helical blade 160 is positioned essentially exactly above position P1 on the bottom edge of first helical blade 160.

In addition, relative to position P1 on the bottom edge of first helical blade 160, position P2 on the bottom edge of second helical blade 162 is positioned at an angle θ offset by 120° about center axial line C in the circumferential direction on outside wall surface 152 of inside cylinder member 64; position Q2 on the top edge of second helical blade 162 is positioned essentially exactly above position P2 on the bottom edge of second helical blade 162.

Similarly, relative to position P1 on the bottom edge of first helical blade 160, position P3 on the bottom edge of third helical blade 164 is positioned at an angle θ offset by 240° about center axial line C in the circumferential direction on outside wall surface 152 of inside cylinder member 64, and relative to position P2 on the bottom edge of second helical blade 162 is positioned at an angle θ offset by 120° about center axial line C in the circumferential direction on outside wall surface 152 of inside cylinder member 64; position Q3 on the top edge of third helical blade 164 is positioned essentially exactly above position P3 on the bottom edge of third helical blade 164.

Circulating flow path portion 156 and helical flow path portion 158 are furnished with three flow paths—first helical flow path 166, second helical flow path 168, and third helical flow path 170—formed in a helical shape by these three helical blades 160, 162, 164, and by inside cylinder member 64 outside wall surface 152 and outside cylinder member 66 inside wall surface 154. Here first helical flow path 166 is formed by first helical blade 160, second helical blade 162, inside cylinder member 64 outside wall surface 152, and outside cylinder member 66 inside wall surface 154. Similarly, second helical flow path 168 is formed by second helical blade 162, third helical blade 164, inside cylinder member 64 outside wall surface 152, and outside cylinder member 66 inside wall surface 154; third helical flow path 170 is formed by first helical blade 160, third helical blade 164, inside cylinder member 64 outside wall surface 152, and outside cylinder member 66 inside wall surface 154.

Note that in the present embodiment, the outside circumferential edges of helical blades 160, 162, and 164 extend to close to outside cylinder member 66 inside wall surface 154, and because a minute gap is formed relative to outside cylinder member 66 inside wall surface 154, the flow path sections of each of the helical flow paths 166, 168, and 170 do not form completely closed flow path sections, but the flow path sections of each of the helical flow paths 166, 168, and 170 can be set to be completely closed flow path sections in which no gap is formed between the outside circumferential edges of helical blades 160, 162, and 164 and the inside wall surface 154 of outside cylinder member 66.

It is also possible to set either 2, 4, or more multiple helical flow paths for helical flow paths 166, 168, and 170.

In addition, each of the three helical flow paths 166, 168, and 170 of helical flow path portion 158 is respectively furnished with entrances 166a, 168a, and 170a positioned at the bottom, and exits 166b, 168b, and 170b positioned essentially immediately above each of the entrances 166a, 168a, and 170a. The lengths of flow paths to reach exits 166b, 168b, and 170b along each of the helical flow paths 166, 168, and 170 from entrances 166a, 168a, and 170a are set to be essentially the same as the length of the circumference of inside cylinder member 64 outside wall surface 152.

As shown in FIGS. 9 and 10, relative to position of first helical flow path 166 entrance 166a the position of second helical flow path 168 entrance 168a is positioned at an angle θ offset by 120° about center axial line C in the circumferential direction on outside wall surface 152 of inside cylinder member 64, and relative to the position of second helical flow path 168 entrance 168a, the position of third helical flow path 170 entrance 170a is positioned at an angle θ offset by 120° about center axial line C in the circumferential direction on outside wall surface 152 of inside cylinder member 64.

Similarly, relative to the position of first helical flow path 166 exit 166b, the position of second helical flow path 168 exit 168b is positioned at an angle θ offset by 120° about center axial line C in the circumferential direction on outside wall surface 152 of inside cylinder member 64, and relative to the position of second helical flow path 168 exit 168b, the position of third helical flow path 170 exit 170b is positioned at an angle θ offset by 120° about center axial line C in the circumferential direction on outside wall surface 152 of inside cylinder member 64.

Next, circulating flow path portion 156 is furnished with a single lower side dispersion chamber 172, formed between vaporizing section 86 and helical flow path portion 158, for dispersing rising raw fuel gas introduced from fuel gas introducing portion 90a into fuel gas supply flow path 20, and rising steam produced by vaporizing section 86.

Circulating flow path portion 156 is furnished with a single upper side dispersion chamber 174, formed between helical flow path portion 158 and reforming section 94, for homogenizing the mixing ratio of raw fuel gas and steam mixed by helical flow path portion 158 and dispersing same over the entire circumference of reforming section 94.

Here the volume V1 of lower side dispersion chamber 172 is set to be smaller than the volume V2 of upper side dispersion chamber 174, and helical flow path portion 158 can be brought into proximity with vaporizing section 86. This permits heat within each of the helical flow paths 166, 168, and 170 of helical flow path portion 158 to be passed to lower vaporizing section 86 using helical blades 160, 162, and 164 as heat conducting media; raw fuel gas and steam can be reliably guided to helical flow path portion 158 together with the rising current generated by this heat passed to this vaporizing section 86.

Furthermore, while there are no helical blades like helical blades 160, 162, and 164 on the helical flow path portion 158 inside upper side dispersion chamber 174, when the mixed currents M of raw fuel gas and steam circulated and mixed inside each of the helical flow path portion 158 helical flow paths 166, 168, and 170 flows into upper side dispersion chamber 174 from each of the exits 166b, 168b, and 170b, these mixed currents M can be dispersed inside upper side dispersion chamber 174, the volume of which is larger than each of the helical flow paths 166, 168, and 170, and caused to rise in a helical form. Thus in upper side dispersion chamber 174, even if the mixing ratios of the mixed currents M respectively differ at the time when they were effectively flow out of exits 166b, 168b, and 170b on helical flow paths 166, 168, and 170, each of the mixed currents M is caused to rise further in a helical shape and makes inside upper side dispersion chamber 174, and the homogenized mixing ratio mixed currents M are supplied to reforming section 94 via inflow ports 176, formed in large numbers on the bottom surface of reforming section 94.

Using solid oxide fuel cell 1 according to an embodiment of the present invention described above, rising raw fuel gas F introduced into fuel gas supply flow path 20 from fuel gas introducing portion 90a, and rising steam S produced by vaporizing section 86, by flowing through helical flow path portion 158 via helical flow path portion 158 lower side dispersion chamber 172, circulate along the circumferential direction of fuel gas supply flow path 20 and are reliably intermixed. The mixed current M of raw fuel gas and steam then further rises, and is supplied uniformly over the entire circumference of the reforming section 94. As it is therefore possible to supply mixed fuel gas and steam evenly and uniformly to the entire reforming section 94, unevenness in the reforming reaction in the reforming section 94 can be restrained, and a solid oxide fuel cell device with excellent practical use obtained.

Using solid oxide fuel cell 1 according to the present embodiment, the mixture ratio of raw fuel gas and steam flowing out from helical flow path portion 158 can be homogenized and dispersed over the entire circumference of reforming section 94 by forming a single upper side dispersion chamber 174 between helical flow path portion 158 and reforming section 94. Therefore raw fuel gas and steam mixed at a uniform ratio can, by a simple structure, be reliably and uniformly supplied to the entirety of reforming section 94.

Furthermore, using solid oxide fuel cell 1 according to the present embodiment, the formation of a single lower side dispersion chamber 172 between vaporizing section 86 and helical flow path portion 158 permits rising raw fuel gas F introduced into fuel gas supply flow path 20 from fuel gas introducing portion 90a and rising steam S produced by vaporizing section 86 to be reliably supplied from lower side dispersion chamber 172 to helical flow path portion 158 and mixed in helical flow path portion 158. Also, setting the volume V1 of this lower side dispersion chamber 172 to be smaller than the volume V2 of upper side dispersion chamber 174 allows helical flow path portion 158 and vaporizing section 86 to be brought into close proximity, and permits the heat inside helical flow path portion 158 helical flow paths 166, 168 and 170 to be transmitted to vaporizing section 86 using helical blades 160, 162, and 164 as heat transfer media. Therefore raw fuel gas and steam can be reliably directed into each of the helical flow path portion 158 helical flow paths 166, 168, and 170 together with the rising current generated by heat transferred from helical flow path portion 158 to vaporizing section 86.

Also, using solid oxide fuel cell 1 according to the present embodiment, circulating flow path portion 156 helical flow path portion 158 is furnished with multiple helical flow paths 166, 168, and 170 by which the heat of circulating flow path portion 156 can be more amply transferred to vaporizing section 86 below via multiple helical flow paths 166, 168, and 170. Therefore more of the rising raw fuel gas and steam current can be generated from vaporizing section 86 to helical flow path portion 158, and raw fuel gas and steam can be supplied evenly and uniformly to helical flow path portion 158, so that variability in the mixing ratio of raw fuel gas F and steam S among each of the helical flow paths 166, 168, and 170 can be restrained.

Moreover, using solid oxide fuel cell 1 according to the present embodiment, each of the exits 166b, 168b, and 170b on helical flow paths 166, 168, and 170 of the helical flow path portion 158 is positioned essentially directly above the position of entrances 166a, 168a, and 170a, and the length of the flow paths from the entrances 166a, 168a, and 170a of helical flow paths 166, 168, and 170 along helical flow paths 166, 168, and 170 up to exits 166b, 168b, and 170b is set to essentially equal the length of the circumference of the outside wall surface 152 of inside cylinder member 64, therefore the perimeter of fuel cell stack 14 can be surrounded by multiple helical flow paths 166, 168, and 170, and the thermal effects of helical flow paths 166, 168, and 170 on fuel cell stack 14 can be made uniform. By keeping the flow path length of the respective multiple helical flow paths 166, 168, and 170 of the helical flow path section 158 at about the length of the outer perimeter of outside wall surface 152 of the inside cylindrical member, there is no unnecessary raising of pressure losses inside helical flow paths 166, 168, and 170, therefore raw fuel gas and steam can be circulated inside helical flow paths 166, 168, and 170 to improve mixing characteristics, and raw fuel gas and steam can be reliably supplied to the reforming section 94 with even a small rising current.

What is claimed is:

1. A solid oxide fuel cell device for generating electricity using reformed fuel gas from a hydrocarbon raw fuel gas, comprising:

a fuel supply apparatus that supplies raw fuel gas;

a water supply apparatus that supplies water to steam reform raw fuel gas supplied by the fuel supply apparatus;

an oxidant gas supply apparatus that supplies oxidant gas for electrical generation;

a fuel cell stack that produces electrical power by reacting the oxidant gas for electrical generation supplied by the oxidant gas supply apparatus and reformed fuel gas;

a combustion section placed above the fuel cell stack, that combusts remaining fuel gas not used for electrical generation in the fuel cell stack;

an inside cylindrical member formed in a substantially cylindrical shape to surround the perimeter of the fuel cell stack;

an outside cylindrical member formed in a substantially cylindrical shape to surround the perimeter of the inside cylindrical member;

a fuel gas supply flow path formed in ring shape between the outside wall surface of the inside cylindrical member and the inside wall surface of the outside cylindrical member, to receive heat from the fuel cell stack and the combustion section;

a fuel gas introducing section, disposed at the lower portion of the fuel gas supply flow path, that introduces raw fuel gas supplied from the fuel supply apparatus into the fuel gas supply flow path;

a water introducing section, disposed at the lower portion of the fuel gas supply flow path, that introduces water supplied from the water supply apparatus into the fuel gas supply flow path;

a vaporizing section, disposed above the fuel gas introducing section, that vaporizes water supplied from the water introducing section;

a reformer disposed within the fuel gas supply flow path above the vaporizing section, to surround the upper portion of the fuel cell stack, that steam reforms raw fuel gas introduced from the fuel gas introducing section using steam produced in the vaporizing section; and a rotary flow path section, placed inside the fuel gas supply flow path between the vaporizing section and the reformer, that causes raw fuel gas introduced into and rising in the fuel gas supply flow path from the fuel gas introducing section and steam produced in the vaporizing section and rising therein to rotate along the circumferential direction of the fuel gas supply flow path, forming a flow which uniformly supplies mixed raw fuel gas and steam over the entire circumference of the reformer.

2. The solid oxide fuel cell device of claim 1, wherein the rotary flow path section is furnished with a helical flow path section forming a helical flow path, that causes rising raw fuel gas introduced from the fuel gas introducing section into the fuel gas supply flow path and rising steam produced in the vaporizing section to rotate along the circumferential direction of the fuel gas supply flow path; and a single first dispersion chamber for homogenizing the mixing of raw fuel gas and steam mixed in the helical flow path section, and dispersing same over the entire circumference of the reformer.

3. The solid oxide fuel cell device of claim 2, wherein the rotary flow path section is further furnished with a single second dispersion chamber formed between the vaporizing section and the helical flow path section, that disperses rising raw fuel gas introduced from the fuel gas introducing section into the fuel gas supply flow path, and rising steam produced in the vaporizing section, and the volume of the second dispersion chamber is set to be smaller than the volume of the first dispersion chamber.

4. The solid oxide fuel cell device of claim 3, wherein the helical flow path section of the rotary flow path section is furnished with plurality of helical flow passageways formed in a helical shape along the circumferential direction of the helical flow path section.

5. The solid oxide fuel cell device of claim 4, wherein the plurality of helical flow passageways of the helical flow path section are each furnished with an entrance positioned at the bottom end, and an exit positioned approximately above the position of the entrance; and the length of the flow path from the entrance to the exit along the helical flow passageway is approximately equal to the outside perimeter length of the inside cylindrical member.

\* \* \* \* \*